US010545898B2

(12) United States Patent
Choi et al.

(10) Patent No.: US 10,545,898 B2
(45) Date of Patent: Jan. 28, 2020

(54) SHARED RESOURCE ACCESS ARBITRATION METHOD, AND SHARED RESOURCE ACCESS ARBITRATION DEVICE AND SHARED RESOURCE ACCESS ARBITRATION SYSTEM FOR PERFORMING SAME

(71) Applicant: Samsung Electronics Co., Ltd., Suwon-si, Gyeonggi-do (KR)

(72) Inventors: Yong-seok Choi, Seoul (KR); Joon-ho Song, Hwaseong-si (KR)

(73) Assignee: Samsung Electronics Co, Ltd., Suwon-si (KR)

( * ) Notice: Subject to any disclaimer, the term of this patent is extended or adjusted under 35 U.S.C. 154(b) by 0 days.

(21) Appl. No.: 15/559,129

(22) PCT Filed: Mar. 11, 2016

(86) PCT No.: PCT/KR2016/002467
§ 371 (c)(1),
(2) Date: Sep. 18, 2017

(87) PCT Pub. No.: WO2016/148449
PCT Pub. Date: Sep. 22, 2016

(65) Prior Publication Data
US 2018/0246828 A1    Aug. 30, 2018

(30) Foreign Application Priority Data

Mar. 18, 2015  (KR) .......................... 10-2015-0037699

(51) Int. Cl.
*G06F 13/364* (2006.01)
*G06F 9/50* (2006.01)
*G06F 13/16* (2006.01)

(52) U.S. Cl.
CPC .......... *G06F 13/364* (2013.01); *G06F 9/5011* (2013.01); *G06F 13/1673* (2013.01)

(58) Field of Classification Search
USPC ........................................ 710/113, 241, 309
See application file for complete search history.

(56) References Cited

U.S. PATENT DOCUMENTS 6,687,240 B1 * 2/2004 Moertl ................ G06F 13/4036
370/351
8,214,617 B2 7/2012 Min et al.
(Continued)

FOREIGN PATENT DOCUMENTS

KR  10-2007-0089264 A    8/2007
WO     2014/052543 A1    4/2014

OTHER PUBLICATIONS

Korean Office Action dated Sep. 25, 2019, issued in Korean Patent Application No. 10-2015-037699.

*Primary Examiner* — Ilwoo Park
(74) *Attorney, Agent, or Firm* — Jefferson IP Law, LLP

(57) ABSTRACT

Provided is a shared resource access arbitration method of a shared resource access arbitration apparatus, the shared resource access arbitration method including: receiving, from at least one master apparatus, buffer status information related to a buffer included in the at least one master apparatus; determining, based on the received buffer status information, priorities of shared resource access requests received from a plurality of master apparatuses including the at least one master apparatus; and granting, according to the determined priorities of the shared resource access requests, one of the shared resource access requests having a high priority.

9 Claims, 19 Drawing Sheets

(56) References Cited

U.S. PATENT DOCUMENTS

| | | |
|---|---|---|
| 2004/0027990 A1 | 2/2004 | Lee et al. |
| 2007/0198730 A1 | 8/2007 | Tsai et al. |
| 2007/0233923 A1* | 10/2007 | Lee ................. G06F 13/362 710/116 |
| 2011/0131385 A1* | 6/2011 | Henriksson ......... G06F 13/1642 711/158 |
| 2015/0046677 A1 | 2/2015 | Moloney et al. |

* cited by examiner

FIG. 8A
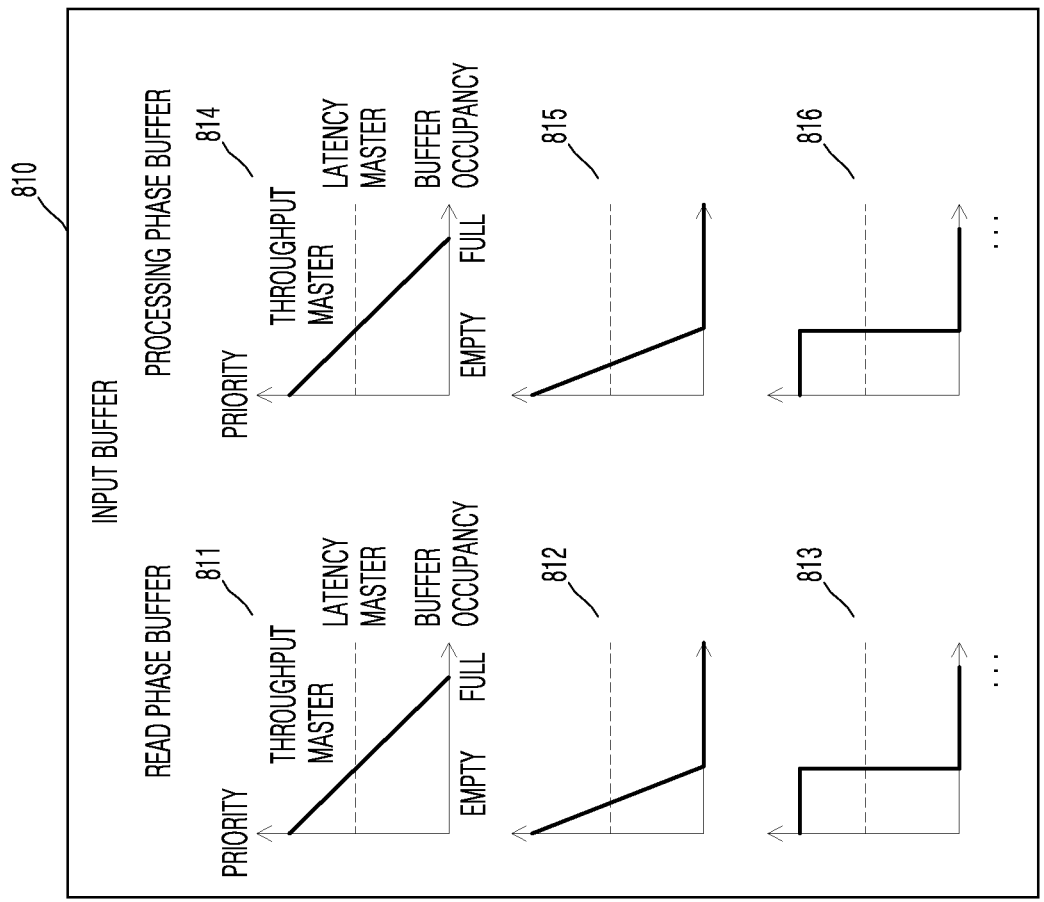
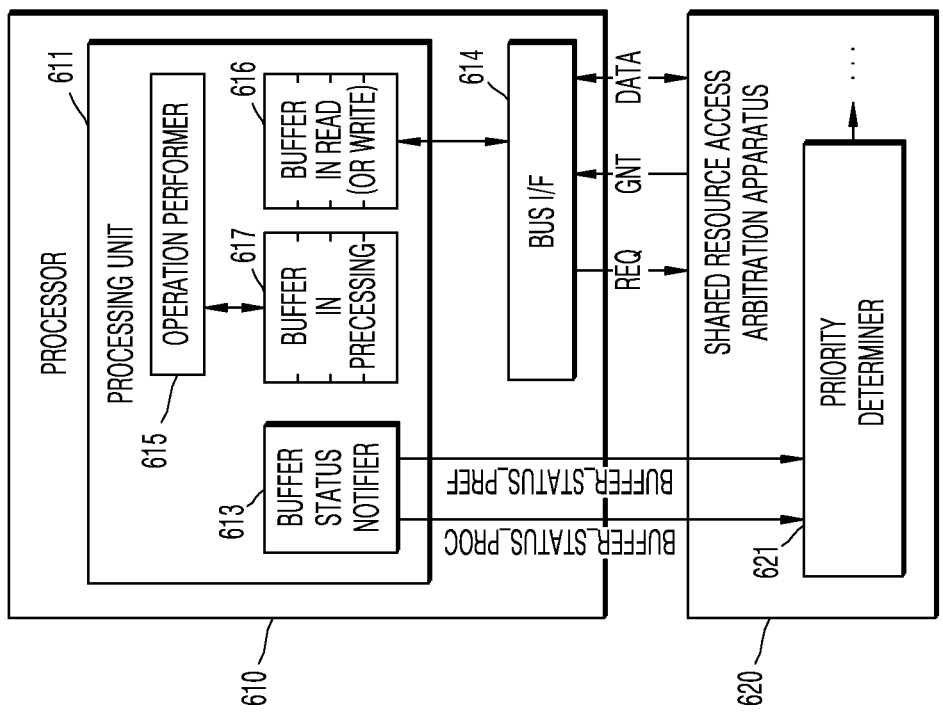

SHARED RESOURCE ACCESS ARBITRATION METHOD, AND SHARED RESOURCE ACCESS ARBITRATION DEVICE AND SHARED RESOURCE ACCESS ARBITRATION SYSTEM FOR PERFORMING SAME

CROSS-REFERENCE TO RELATED APPLICATION(S)

This application is a U.S. National Stage application under 35 U.S.C. § 371 of an International application filed on Mar. 11, 2016 and assigned application number PCT/KR2016/002467, which claimed the benefit of a Korean patent application filed on Mar. 18, 2015 in the Korean Intellectual Property Office and assigned Serial number 10-2015-0037699, the entire disclosure of which is hereby incorporated by reference.

TECHNICAL FIELD

The present disclosure relates to a shared resource access arbitration method and a shared resource access arbitration apparatus and shared resource access arbitration system for performing the same.

BACKGROUND ART

A multimedia data processing system in which a massive amount of data, such as images and video data, is frequently or regularly input and output, or a heterogeneous multi-core parallel processing system in which a general purpose processor (GPP), a direct memory access (DMA) controller, and an application-specific hardware (H/W) accelerator access a shared resource apparatus using different data access patterns includes an arbiter that grants access requests regarding a shared resource apparatus according to priority. In spite of the existence of the arbiter, a bank conflict may occur when several master apparatuses simultaneously request access to a shared resource apparatus such as a memory. Also, a master apparatus that has a shared resource access request not granted may stall until the master apparatus is allowed to access the shared resource apparatus. In particular, when the master apparatus is a very long instruction word (VLIW) processor, a unit that has nothing to do with a memory operation may also stall, and thus, performance of a multi-core system may be considerably degraded.

An idea for solving the above problems by separating shared resource access requests in a spatial region by physically separating a shared resource apparatus for each purpose was proposed. However, this solution has problems in that a physical area of the shared resource apparatus increases compared to an identical capacity, available capacity further decreases compared to an identical capacity, and complexity increases because related application software (S/W) should manage data by taking a physical structure into account.

DETAILED DESCRIPTION OF THE INVENTION

Technical Problem

The present invention provides a shared access arbitration method for preventing the occurrence of a bank conflict and performance degradation of a master apparatus by determining priorities of shared resource access requests by using buffer status information in the master apparatus or by adding a buffer, and a shared access arbitration apparatus and shared access arbitration system for performing the shared access arbitration method.

Technical Solution

According to an embodiment of the present invention, a shared resource access arbitration method includes: receiving, from at least one master apparatus, buffer status information related to a buffer included in the at least one master apparatus; determining, based on the received buffer status information, priorities of shared resource access requests received from a plurality of master apparatuses including the at least one master apparatus; and granting, according to the determined priorities of the shared resource access requests, one of the shared resource access requests having a high priority.

According to an embodiment of the present invention, a shared resource access arbitration apparatus includes: a buffer status information receiving unit configured to receive, from at least one master apparatus, buffer status information related to a buffer included in the at least one master apparatus; and a controller configured to determine, based on the received buffer status information, priorities of shared resource access requests received from a plurality of master apparatuses including the at least one master apparatus, and grant, according to the determined priorities of the shared resource access requests, one of the shared resource access requests having a high priority.

According to another embodiment of the present invention, a shared resource access arbitration method includes: receiving a first shared resource access request from at least one first master apparatus; storing the first shared resource access request in a buffer connected between a bus connected to the first master apparatus and a bus connected to a shared resource apparatus; determining priority of the stored first shared resource access request based on a second shared resource access request related to at least one second master apparatus and buffer status information related to the buffer; and granting one of the stored first shared resource access request and the second shared resource access request according to the determined priority.

According to an embodiment of the present invention, a shared resource access arbitration system includes: an access buffer configured to receive first shared resource access requests from at least one first master apparatus and store at least one of the received first shared resource access requests, and connected between a bus of the first master apparatus and a bus connected to a shared resource apparatus; and a shared resource access arbitration apparatus configured to receive the first shared resource access request from the access buffer and a second shared resource access request from at least one second master apparatus, determine priority of the received first shared resource access request and the received second shared resource access request, and grant a shared resource access request of one of the received first shared resource access request and the received second shared resource access request having a higher priority according to the determined priority, wherein the access buffer is further configured to receive the second shared resource access request from the second master apparatus, determine whether to store at least one of the received first shared resource access requests in the access buffer based on the received second shared resource access request and buffer status information of the access buffer and store at least one of the received first shared resource access requests, and transmit a shared resource access request of one of the stored first shared resource access requests to the shared resource access arbitration apparatus based on the received second shared resource access request and the buffer status information of the access buffer.

According to an embodiment of the present invention, a recording medium has recorded thereon a computer program for executing the above methods and thus may be read by a computer.

Advantageous Effects of the Invention

According to one or more embodiments of the present invention, performance degradation of master apparatuses due to a stall phenomenon of the master apparatuses may be prevented. Also, the occurrence of a bank conflict may be prevented.

DESCRIPTION OF THE DRAWINGS

FIGS. 8A and 8B are diagrams showing a process in which a shared resource access arbitration apparatus determines a priority of a shared resource access request of a master apparatus based on buffer status information of a buffer in processing and/or a buffer in read or write included in the master apparatus, according to an embodiment of the present invention.

BEST MODE

Figure 1A:
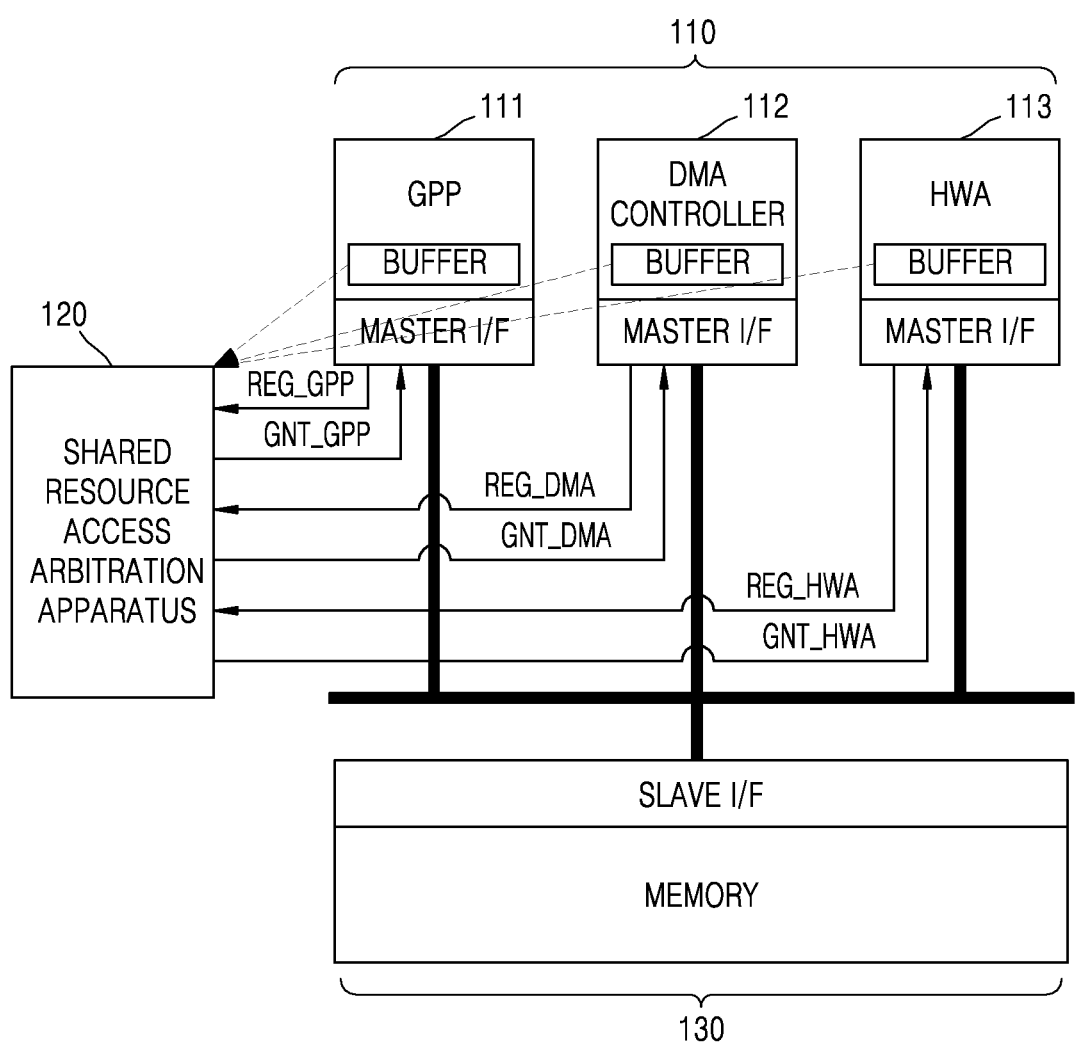
FIGS. 1A and 1B are diagrams showing an environment of a shared resource access arbitration system according to various embodiments of the present invention.

According to an embodiment of the present invention, a shared resource access arbitration method includes: receiving, from at least one master apparatus, buffer status information related to a buffer included in the at least one master apparatus; determining, based on the received buffer status information, priorities of shared resource access requests received from a plurality of master apparatuses including the at least one master apparatus; and granting, according to the determined priorities of the shared resource access requests, one of the shared resource access requests having a high priority.

Mode of the Invention

In various embodiments of the present invention described herein, the term 'image' may generally refer to not only a still image but also a moving image such as video.

A shared resource access arbitration method and a shared resource access arbitration apparatus and shared resource access arbitration system for performing the same, according to various embodiments, will be described hereinafter with reference to FIGS. 1A to 14.

The singular forms "a," "an," and "the" used herein are intended to include the plural forms as well, unless the context clearly indicates otherwise.

Hereinafter, the embodiments will be described in detail with reference to the accompanying drawings. Like reference numerals in the drawings denote like elements, and thus, a repeated description thereof can be omitted.

Figure 1B:
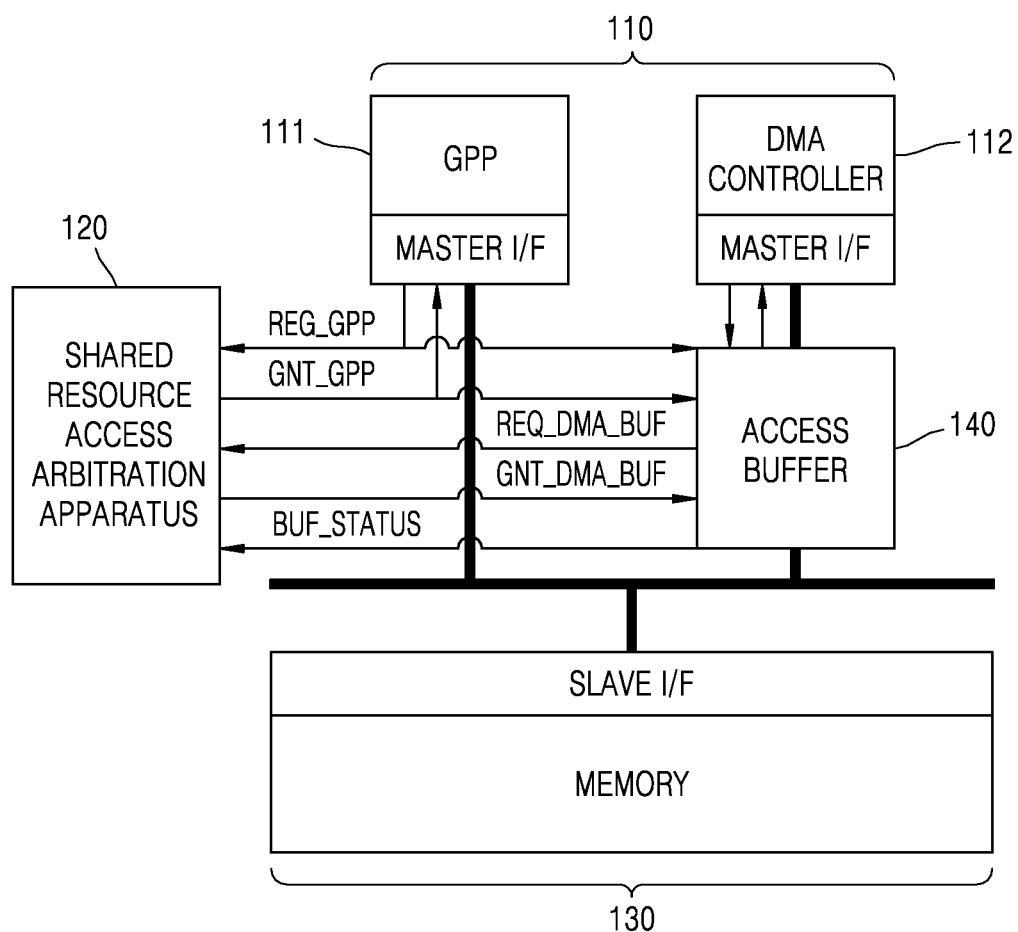

FIGS. 1A and 1B are diagrams showing an environment of a shared resource access arbitration system according to various embodiments of the present invention.

Referring to FIG. 1A, master apparatuses 110 such as a general purpose processor (GPP) 111, a direct memory access (DMA) controller 112, and a hardware accelerator (HWA) 113 may each transmit a shared resource access request to a shared resource apparatus such as a memory 113 in order to read or write data from or to the shared resource apparatus such as the memory 113. In this regard, when the memory 130 directly receives shared resource access requests from the master apparatuses 110 simultaneously, a bank conflict occurs.

A shared resource access arbitration apparatus 120 receives shared resource access requests req_gpp, req_dma, and req_hwa from the master apparatuses 110, and grants one shared resource access request according to a predetermined priority. For example, the shared resource access arbitration apparatus 120 transmits a message gnt_gpp, gnt_dma, or gnt_hwa for granting one shared resource access request according to a predetermined priority to a master apparatus from among the master apparatuses 110 having transmitted the granted shared resource access request. Accordingly, when a shared resource access request of a master apparatus 110 is granted, a master apparatus from among the master apparatuses 110 having transmitted the granted shared resource access request is accessible to the memory 130.

When the master apparatuses 110 transmit shared resource access requests to the shared resource access arbitration apparatus 120, the master apparatuses 110 may transmit the shared resource access requests to the memory 130.

For example, when the GPP 111 and the DMA controller 112 may transmit memory access requests to the memory 130, the GPP 111 and the DMA controller 112 may transmit shared resource access requests to the shared resource access arbitration apparatus 120.

When it is assumed that the GPP 111 transmits a memory access request to the memory 130 and the DMA controller 112 also transmits a memory access request to the memory 130, the GPP 111 and the DMA controller 112 transmit the memory access requests to the same memory 130, and thus, a bank conflict still occurs.

However, when transmitting shared resource access requests, the master apparatuses 110 transmit the shared resource access requests to the shared resource access arbitration apparatus 120, and thus, a master apparatus that has transmitted a shared resource access request granted from the shared resource access arbitration apparatus 120 may have priority in accessing the memory 130. When a bank conflict occurs, a master apparatus that has a transmitted shared resource access request not granted stalls until the master apparatus is allowed to access a corresponding memory (that is, until the shared resource access request is granted).

In some cases, the shared resource access arbitration apparatus 120 may determine a priority of a throughput-sensitive master apparatus such as the DMA controller 112 and the HWA 113 to be higher than a priority of a latency-sensitive master apparatus such as the GPP 111. In this regard, when a shared resource access request transmitted from a latency-sensitive master apparatus such as the GPP 111 is not granted, the latency-sensitive master apparatus such as the GPP 111 stalls until it is allowed to use a corresponding memory, and accordingly, considerable degradation of performance occurs.

The shared resource access arbitration apparatus 120 according to an embodiment of the present invention may receive pieces of buffer status information related to buffers included in the master apparatuses 110 from the master apparatuses 110, respectively, and may determine priorities of the shared resource access requests received from the master apparatuses 110 based on the received pieces of buffer status information.

The shared resource access arbitration apparatus 120 may determine a priority of a shared resource access request by using buffer status information based on a high correlation between a stall phenomenon of a master apparatus and a buffer status, and thus, may prevent performance degradation of the master apparatuses 110 resulting from a stall phenomenon of the master apparatuses 110. Particularly, the buffer status information may be received from management logic without nearly adding a circuit to the management logic present in the master apparatuses 110, and accordingly, it is not difficult to implement a circuit for receiving buffer status information.

Referring to FIG. 1B, unlike FIG. 1A, an access buffer 140 is between a throughput-sensitive master apparatus, such as the DMA controller 112, desiring buffering and the memory 130. The access buffer 140 receives a shared resource access request from the throughput-sensitive master apparatus such as the DMA controller 112, and when a bank conflict is expected to occur, the shared resource access request is stored in the access buffer 140 without being transmitted to the shared resource access arbitration apparatus 120. Accordingly, the occurrence of a bank conflict may be prevented. That is, shared resource access requests received from the master apparatuses 110 may be separated in a temporal region by adding the access buffer 140, and thus, the occurrence of a bank conflict may be prevented.

The shared resource access arbitration apparatus 120 may receive buffer status information buf_status related to an access buffer from the access buffer 140, and may dynamically determine a priority of a shared resource access request based on the buffer status information buf_status. The shared resource access arbitration apparatus 120 may prevent a stall phenomenon of a latency-sensitive master apparatus such as the GPP 111 by granting one shared resource access request according to the determined priority.

Figure 2:
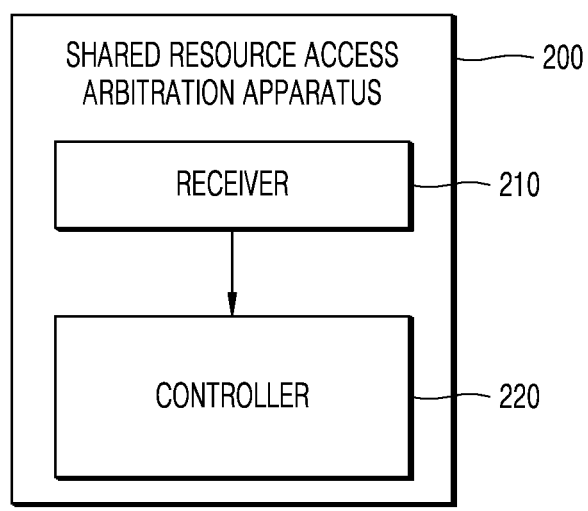
FIG. 2 is a block diagram of a shared resource access arbitration apparatus according to an embodiment of the present invention.

FIG. 2 is a block diagram of a shared resource access arbitration apparatus 200 according to an embodiment of the present invention.

In FIG. 2, the shared resource access arbitration apparatus 200 according to the present embodiment may include a receiver 210 and a controller 220.

Referring to FIG. 2, the receiver 210 may receive, from at least one master apparatus, buffer status information related to a buffer included in the at least one master apparatus.

The buffer status information may include size information of stored data compared to a total storage space of the buffer. For example, the buffer status information may include information regarding occupancy of the buffer. The buffer status information may include information related to buffer status of an input or output buffer. Also, the buffer status information may include at least one of information related to status of a buffer including data which is transmitted to and received from an external apparatus and information related to status of a buffer including data related to internal processing of the master apparatus. Also, the buffer status information may include information related to status of a plurality of buffers included in one master apparatus.

The receiver 210 may receive shared resource access requests from a plurality of master apparatuses.

The controller 220 determines priorities of the shared resource access requests received from the plurality of master apparatuses based on the buffer status information received in the receiver 210.

The controller 220 may grant one of the shared resource access requests having a high priority according to the determined priorities of the shared resource access requests.

The controller 220 may use buffer status information including information related to status of an input buffer and determine, when a size of data compared to a total storage space of the input buffer is small, a priority of a shared resource access request received from a master apparatus including the input buffer to be higher than a priority of a shared resource access request received from another master apparatus.

The controller 220 may use buffer status information including information related to status of an output buffer and determine, when a size of data compared to a total storage space of the output buffer is large, a priority of a shared resource access request received from a master apparatus including the output buffer to be higher than a priority of a shared resource access request received from another master apparatus.

For example, the controller 220 may adaptively determine priority according to storage status of data in a current buffer. The storage status of data may be a proportion of unused data of a master apparatus compared to a maximum buffer storage space, or a proportion of untransmitted data compared to a maximum buffer storage space.

In detail, when the current buffer is an input buffer for storing data which is received from an external memory apparatus and is processed by a master apparatus, as a proportion of a storage space of data not used in the master apparatus compared to a maximum space of the buffer decreases, the controller 220 may assign a higher priority to the master apparatus including the input buffer than to another master apparatus. On the other hand, when the current buffer is an output buffer for storing data which is transmitted from a master apparatus to an external memory apparatus, as a proportion of a storage space of data not transmitted to the external memory apparatus compared to a maximum space of the buffer increases, the controller 220 may assign a higher priority to the master apparatus including the output buffer than to another master apparatus. When a type of a buffer is a first in first out (FIFO) type, the controller 220 may determine storage status of data in the buffer by combining location information of a read or write pointer of the buffer in a master apparatus, or location information of a read pointer and location information of a write pointer of the buffer in a master apparatus.

Also, the controller 220 may determine a priority of a shared resource access request received from at least one master apparatus based on buffer status information including information regarding status of a plurality of buffers.

The controller 220 may determine a priority of a shared resource access request received from at least one master apparatus based on buffer status information including information related to status of a first buffer including data which is transmitted to or received from an external apparatus and a second buffer including data related to internal processing of the at least one master apparatus.

Buses respectively connected to the plurality of master apparatuses and a bus connected to a shared resource apparatus may be connected to the shared resource access arbitration apparatus 200, and the controller 220 may determine a bus, from among the buses respectively connected to the plurality of master apparatuses, connected to a master apparatus having transmitted a granted shared resource access request so that the master apparatus, from among the plurality of master apparatuses, having transmitted the granted shared resource access request may access the shared resource apparatus, and may arbitrate data which is transmitted and received between the master apparatus having transmitted the granted shared resource access request and the shared resource apparatus via the determined bus.

The shared resource access arbitration apparatus 200 according to another embodiment of the present invention first stores a shared resource access request received from a master apparatus in a buffer connected between a bus of the master apparatus and a bus connected to a shared resource apparatus, and determines priority of the stored shared resource access request based on buffer status information related to the buffer.

The receiver 210 receives a first shared resource access request from at least one first master apparatus and receives a second shared resource access request from at least one second master apparatus.

The controller 220 controls the first shared resource access request so as to be stored in a buffer connected between a bus of the first master apparatus and a bus connected to a shared resource apparatus.

The controller 220 may determine priority of the stored first shared resource access request based on the second shared resource access request related to the at least one second master apparatus and buffer status information related to the buffer, and may grant one of the stored first shared resource access request and the second shared resource access request based on the determined priority.

Figure 3:
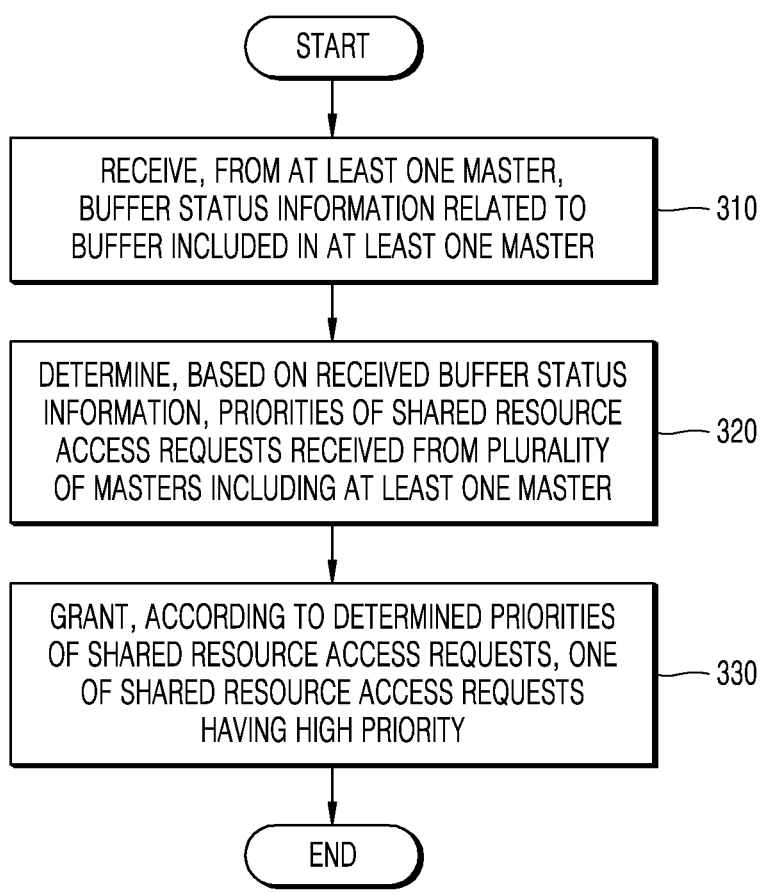
FIG. 3 is a flowchart of a shared resource access arbitration method according to an embodiment of the present invention.

FIG. 3 is a flowchart of a shared resource access arbitration method according to an embodiment of the present invention.

Referring to FIG. 3, in operation 310, the shared resource access arbitration apparatus 200 receives, from at least one master apparatus, buffer status information related to a buffer included in the at least one master apparatus.

In operation 320, the shared resource access arbitration apparatus 200 determines priorities of shared resource access requests received from a plurality of master apparatuses including the at least one master apparatus based on the received buffer status information.

In operation 330, the shared resource access arbitration apparatus 200 may grant one of the shared resource access requests having a high priority according to the determined priorities of the shared resource access requests.

Figure 4:
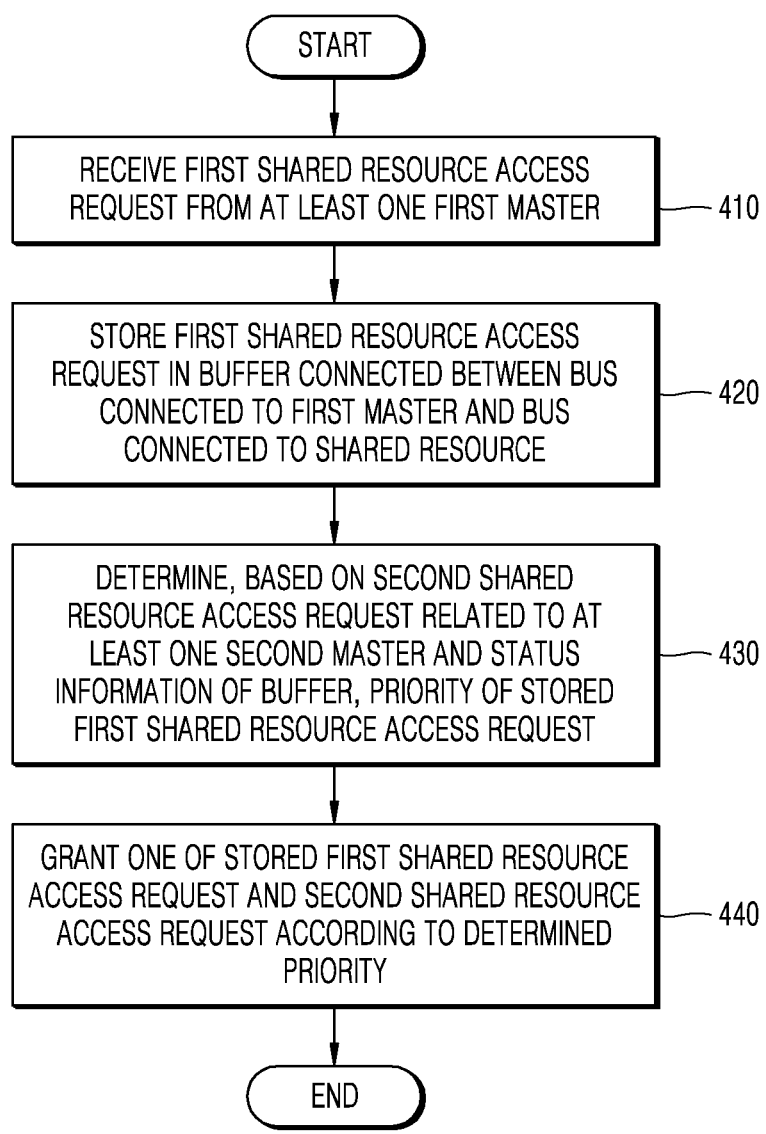
FIG. 4 is a flowchart of a shared resource access arbitration method according to another embodiment of the present invention.

FIG. 4 is a flowchart of a shared resource access arbitration method according to another embodiment of the present invention.

Referring to FIG. 4, in operation 410, the shared resource access arbitration apparatus 200 receives a first shared resource access request from at least one first master apparatus.

In operation 420, the shared resource access arbitration apparatus 200 stores the first shared resource access request in a buffer connected between a bus of the first master apparatus and a bus connected to a shared resource apparatus. In detail, the shared resource access arbitration apparatus 200 may receive a second shared resource access request from at least one second master apparatus, and may store the first shared resource access request based on the received second shared resource access request. Alternatively, the shared resource access arbitration apparatus 200 may store the first shared resource access request based on buffer status information related to the buffer.

In operation 430, the shared resource access arbitration apparatus 200 may determine priority of the stored first shared resource access request based on the second shared resource access request related to the at least one second master apparatus and the buffer status information of the buffer.

In operation 440, the shared resource access arbitration apparatus 200 may grant one of the stored first shared resource access request and the second shared resource access request according to the determined priority.

Figure 5:
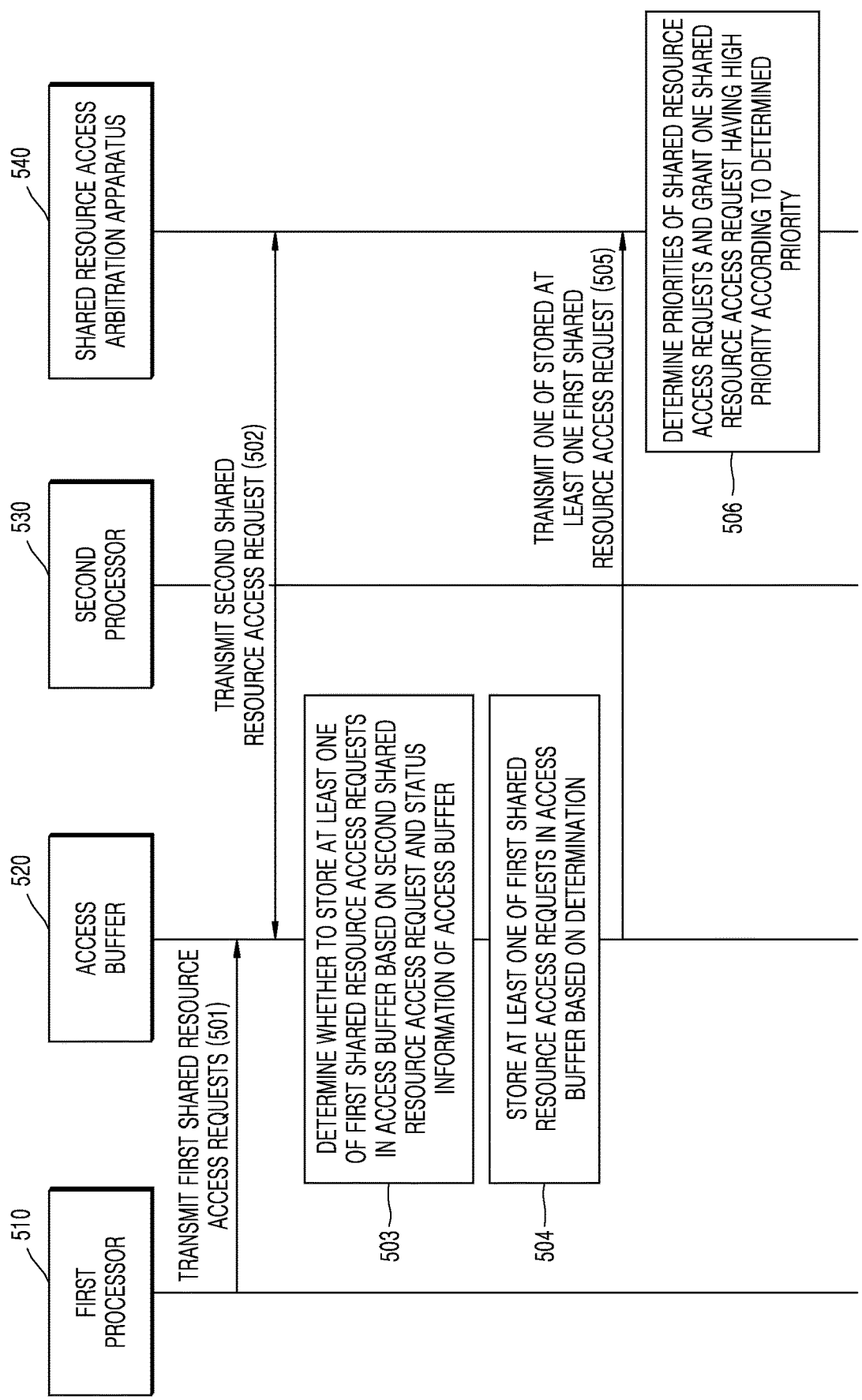
FIG. 5 is a flowchart of a process of granting one shared resource access request according to priority in a shared resource access arbitration system including a shared resource access arbitration apparatus, according to an embodiment of the present invention.

FIG. 5 is a flowchart of a process of granting one shared resource access request according to priority in a shared resource access arbitration system including a shared resource access arbitration apparatus, according to an embodiment of the present invention.

Referring to FIG. 5, in operation 501, a first processor 510 transmits first shared resource access requests to an access buffer 520.

In operation 502, a second processor 530 may transmit a second shared resource access request to a shared resource access arbitration apparatus 540. In this regard, the second processor 530 may transmit the second shared resource access request to the access buffer 520.

In operation 503, the access buffer 520 determines whether to store at least one of the first shared resource access requests in the access buffer 520 based on the second shared resource access request and buffer status information of the access buffer 520.

In operation 504, the access buffer 520 may store at least one of the first shared resource access requests in the access buffer 520 based on the determination.

In operation 505, the access buffer 520 may transmit one of the stored at least one first shared resource access request to the shared resource access arbitration apparatus 540.

In operation 506, the shared resource access arbitration apparatus 540 may determine priorities of the shared resource access requests, and may grant one shared resource access request having a high priority according to the determined priority. In this regard, the shared resource access arbitration apparatus 540 may determine priorities of the shared resource access requests according to a type of a master apparatus having transmitted a shared resource access request. For example, the shared resource access arbitration apparatus 540 may determine, according to whether the master apparatus having transmitted the shared resource access request is a latency-sensitive master apparatus or throughput-sensitive master apparatus, a priority of the shared resource access request received from the master apparatus differently.

Figure 6:
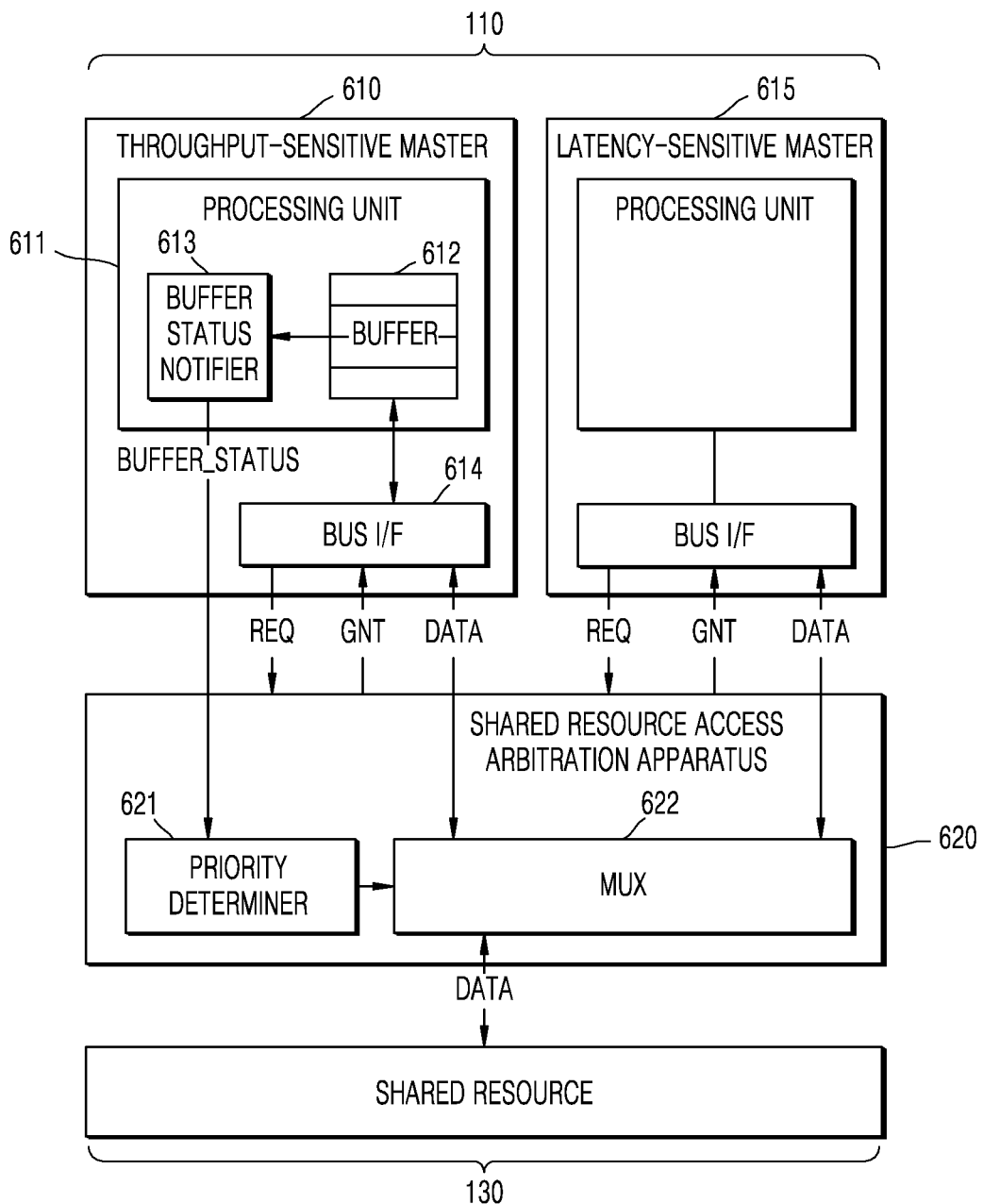
FIG. 6 is a diagram showing a process of determining a priority of a shared resource access request received in a shared resource access arbitration apparatus, according to an embodiment of the present invention.

FIG. 6 is a diagram showing a process of determining a priority of a shared resource access request received in a shared resource access arbitration apparatus, according to an embodiment of the present invention.

Referring to FIG. 6, a throughput-sensitive master apparatus 610 from among the master apparatuses 110 may include a processing unit 611, and may transmit buffer status information related to a buffer 612 included in the processing unit 611 from the buffer 612 to a buffer status notifier 613 included in the processing unit 611. In this regard, the buffer status notifier 613 may transmit buffer status information buffer status related to the buffer 612 to a shared resource access arbitration apparatus 620.

The shared resource access arbitration apparatus 620 includes a priority determiner 621. The priority determiner 621 may determine priorities of shared resource access requests req received from the master apparatuses 110 based on the received buffer status information buffer status related to the buffer 612.

The shared resource access arbitration apparatus 620 may grant gnt one of the shared resource access requests req received from the master apparatuses 110 according to the determined priority.

Buses connected to the master apparatuses 110 in order to transmit and receive data may be connected to a Mux 622, and a bus connected to a shared resource apparatus 630 in order to transmit and receive data may be connected to the Mux 622. The priority determiner 621 may control an operation of the Mux 622. In detail, the Mux 622 may select one of the buses connected to the master apparatuses 110 according to the determined priority and may arbitrate transmission and reception of data between a master apparatus connected to the selected bus and the shared resource apparatus 630 via the selected bus.

Although FIG. 6 illustrates as if buffer status information related to a buffer included in a latency-sensitive master apparatus 615 from among the master apparatuses 110 were not received, the present disclosure is not limited thereto, and the buffer status information related to the buffer included in the latency-sensitive master apparatus 615 may also be received, and priorities of shared resource access requests may be determined based on the buffer status information received from the latency-sensitive master apparatus 615.

Although the shared resource access arbitration apparatus 620 has been described above based on the assumption that it includes the Mux 622, the present disclosure is not limited thereto, and the shared resource access arbitration apparatus 620 may not include the Mux 622. When the master apparatus 610 receives a grant gnt regarding a shared resource access request req from the shared resource access arbitration apparatus 620, the master apparatus 610 may transmit a shared resource access request to the shared resource apparatus 630 via a bus that the master apparatuses 110 and the shared resource apparatus 630 share, and may transmit and receive data to or from the shared resource apparatus 630 by accessing the shared resource apparatus 630 via the bus.

In detail, a process in which the priority determiner 621 dynamically determines priority of received shared resource access requests based on received buffer status information will be described below with reference to FIGS. 7 and 8B.

Figure 7:
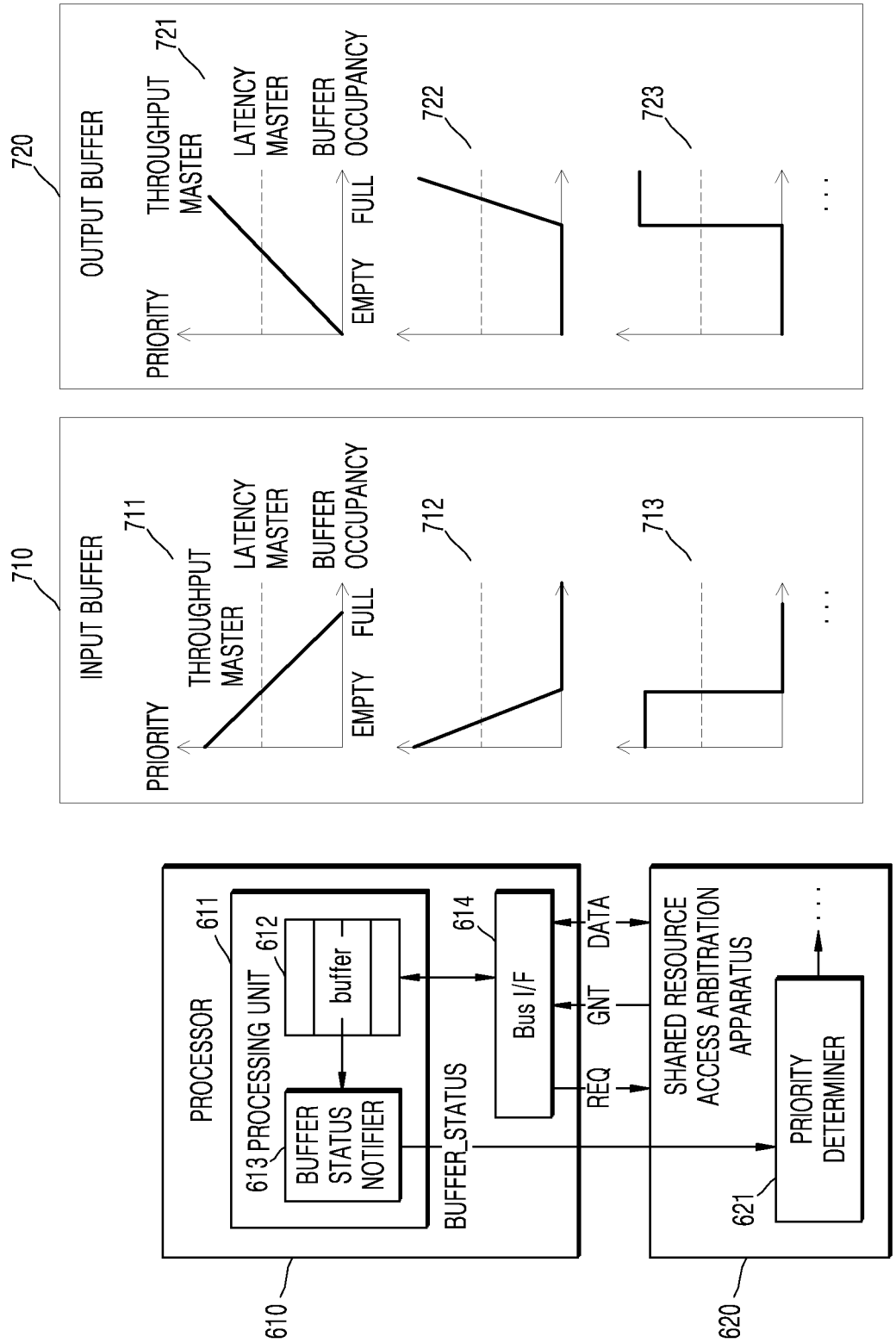
FIG. 7 is a diagram showing a process of determining a priority of a shared resource access request, particularly based on buffer status information related to input and output buffers, in a shared resource access arbitration apparatus, according to an embodiment of the present invention.
Figure 8B:
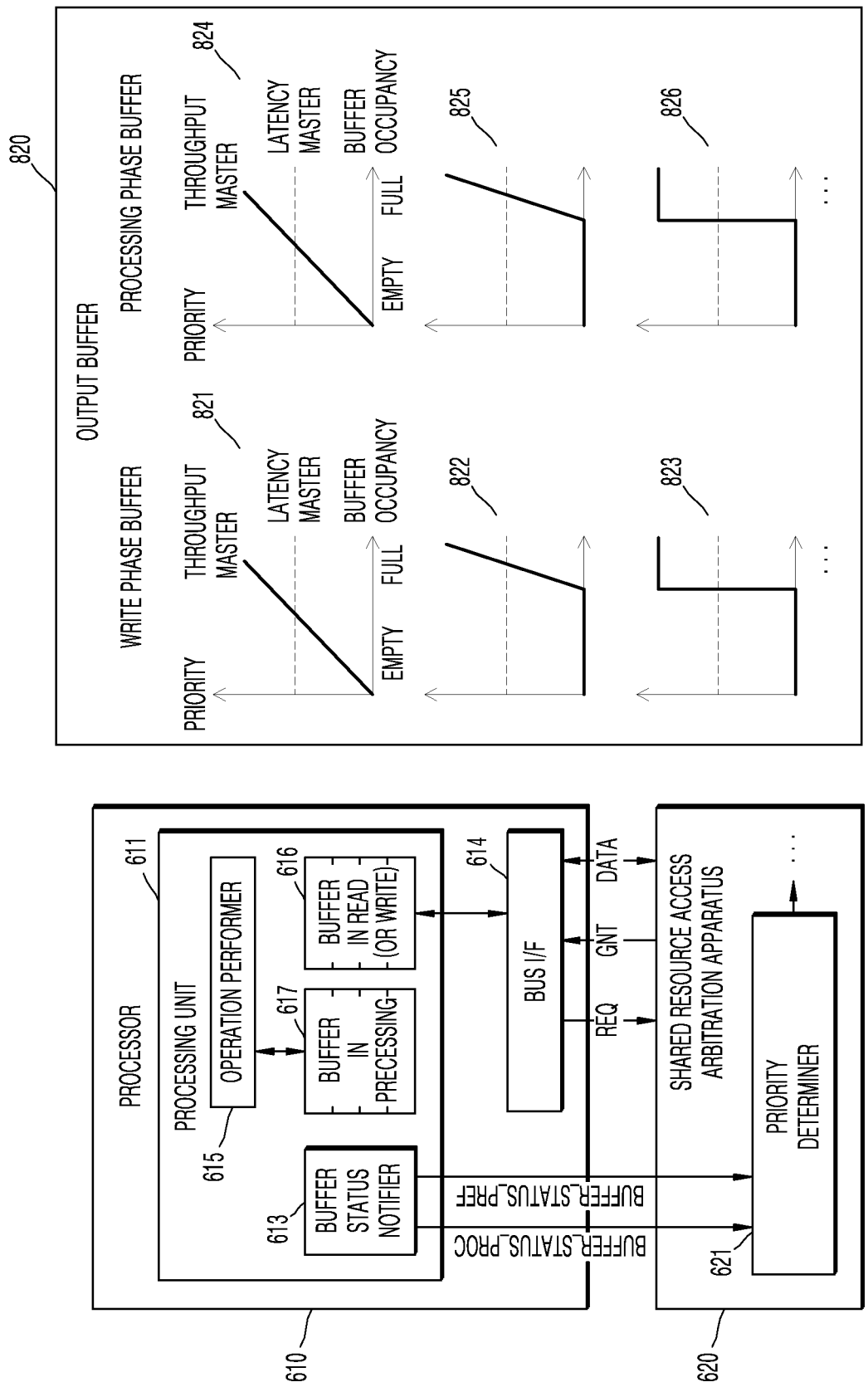

FIGS. 7 to 8B each are diagrams showing a process in which a shared resource access arbitration apparatus determines a priority of a shared resource access request based on buffer status information, according to an embodiment of the present invention.

In FIG. 7, buffer status information that a shared resource access arbitration apparatus refers to in order to determine priorities of shared resource access requests is buffer status information related to an input buffer or output buffer, whereas, in FIG. 8, buffer status information that a shared resource access arbitration apparatus refers to in order to determine a priority of a shared resource access request is buffer status information related to a buffer in processing or buffer in read or write included in an input buffer or output buffer. Particularly, in the case of FIG. 8, priorities of shared resource access requests may be determined by combining buffer status information related to a buffer in processing and a buffer in read or write included in an input buffer or output buffer. Accordingly, a chance of a stall of a more accurate master apparatus may be estimated.

FIG. 7 is a diagram showing a process of determining a priority of a shared resource access request, particularly based on buffer status information related to input and output buffers, in a shared resource access arbitration apparatus, according to an embodiment of the present invention.

In the present embodiment, priorities of shared resource access requests received from a latency-sensitive master apparatus are assumed constant.

Referring to FIG. 7, the shared resource access arbitration apparatus 620 is assumed to receive buffer status information related to the buffer 612 included in the processing unit 611 of the throughput-sensitive master apparatus 610 from the buffer status notifier 613.

The priority determiner 621 included in the shared resource access arbitration apparatus 620 may determine priority based on buffer occupancy of an input buffer 710.

For example, referring to a buffer occupancy-priority graph 711, when buffer occupancy of an input buffer included in the master apparatus 610 is empty, the priority determiner 621 may determine a priority of the master apparatus 610 to be higher than that of a latency-sensitive master apparatus. When buffer occupancy of the input buffer included in the master apparatus 610 is full, the priority determiner 621 may determine a priority of the master apparatus 610 to be lower than that of the latency-sensitive master apparatus. Particularly, as buffer occupancy increases, the priority determiner 621 may linearly decrease priority of the master apparatus 610.

For example, referring to a buffer occupancy-priority graph 712, when buffer occupancy of an input buffer included in the master apparatus 610 is empty, the priority determiner 621 may determine a priority of the master apparatus 610 to be higher than that of a latency-sensitive master apparatus. As buffer occupancy of the input buffer included in the master apparatus 610 increases, the priority determiner 621 may linearly decrease priority of the master apparatus 610. When occupancy of the input buffer is equal to or greater than a certain value, priority of the master apparatus 610 may be a constant value.

For example, referring to a buffer occupancy-priority graph 713, when buffer occupancy of the input buffer 710 included in the master apparatus 610 is empty, the priority determiner 621 may determine a priority of the master apparatus 610 to be higher than that of a latency-sensitive master apparatus. When buffer occupancy of an input buffer included in the master apparatus 610 is equal to or less than a certain value regardless of an increase, the priority determiner 621 may determine priority of the master apparatus 610 to be a predetermined first value. When buffer occupancy of the input buffer is equal to or greater than a certain value regardless of an increase in the buffer occupancy of the input buffer, the priority determiner 621 may determine priority of the master apparatus 610 to be a predetermined second value that is less than priority of the latency-sensitive master apparatus.

The priority determiner 621 included in the shared resource access arbitration apparatus 620 may determine priority based on buffer occupancy of an output buffer 720.

For example, referring to a buffer occupancy-priority graph 721, when buffer occupancy of the output buffer 720 included in the master apparatus 610 is empty, the priority determiner 621 may determine a priority of the master apparatus 610 to be lower than that of a latency-sensitive master apparatus. When buffer occupancy of an output buffer included in the master apparatus 610 is full, the priority determiner 621 may determine a priority of the master apparatus 610 to be higher than that of the latency-sensitive master apparatus. Particularly, as buffer occupancy increases, the priority determiner 621 may linearly increase priority of the master apparatus 610.

For example, referring to a buffer occupancy-priority graph 722, when buffer occupancy of an output buffer included in the master apparatus 610 is empty, the priority determiner 621 may determine a priority of the master apparatus 610 to be lower than that of a latency-sensitive master apparatus. When occupancy of the output buffer is equal to or less than a certain value, priority of the master apparatus 610 may be a constant value.

Referring to the buffer occupancy-priority graph 722, when occupancy of the output buffer included in the master apparatus 610 is equal to or greater than a certain value, as the buffer occupancy of the output buffer increases, the priority determiner 621 may linearly increase priority of the master apparatus 610.

For example, referring to a buffer occupancy-priority graph 723, when buffer occupancy of an output buffer included in the master apparatus 610 is empty, the priority determiner 621 may determine a priority of the master apparatus 610 to be lower than that of a latency-sensitive master apparatus. When buffer occupancy of the output buffer included in the master apparatus 610 is equal to or less than a certain value regardless of an increase, the priority determiner 621 may determine priority of the master apparatus 610 to be a predetermined first value. When buffer occupancy of the output buffer is equal to or greater than a certain value, the priority determiner 621 may determine a priority to be higher than that of the latency-sensitive master apparatus. In this regard, when buffer occupancy of the output buffer is equal to or greater than a certain value, the priority determiner 621 may determine priority of the master apparatus 610 to be a predetermined second value that is greater than priority of the latency-sensitive master apparatus.

Although it has been described above with reference to the buffer occupancy-priority graphs 711-713 and 721-723 that the priority determiner 621 dynamically changes priority of the throughput-sensitive master apparatus 610, the present disclosure is not limited thereto, and the priority determiner 621 may determine priority of the throughput-sensitive master apparatus 610 based on a correlation between various buffer occupancies and priority.

Although it has been assumed for convenience of description that the priority determiner 621 determines priority of a latency-sensitive master apparatus to be static, the present disclosure is not limited thereto, and the priority determiner 621 may change priority of the latency-sensitive master apparatus according to buffer occupancy.

Although the priority determiner 621 has been described above as receiving only buffer status information related to a buffer included in the throughput-sensitive master apparatus 610 and determining a priority of a shared resource access request based on only the received buffer status information, the present disclosure is not limited thereto, and the priority determiner 621 may receive buffer status information related to a buffer included in a latency-sensitive master apparatus and may determine a priority of a shared resource access request based on the received buffer status information.

Although the priority determiner 621 determines a priority of a shared resource access request based on buffer status information related to one of the input buffer 710 and the output buffer 720, the present disclosure is not limited thereto, and the priority determiner 621 may determine a priority of a shared resource access request based on buffer status information of the input buffer 710 and buffer status information of the output buffer 720.

FIGS. 8A and 8B are diagrams showing a process in which a shared resource access arbitration apparatus determines a priority of a shared resource access request of a master apparatus based on buffer status information of a buffer in processing included in the master apparatus and/or buffer status information of a buffer in read or write, according to an embodiment of the present invention.

In the present embodiment, a priority of a shared resource access request received from a latency-sensitive master apparatus is assumed constant.

Referring to FIGS. 8A and 8B, the shared resource access arbitration apparatus 620 is assumed to receive buffer status information buffer_status_proc related to a buffer in processing 617 included in the processing unit 611 of the throughput-sensitive master apparatus 610 or buffer status information buffer_status_pref related to a buffer in read or write 616 from the buffer status notifier 613. The buffer in processing 617 refers to a buffer including data related to an operation which is performed in an operation performer 615. For example, the buffer in processing 617 may be a buffer directly connected to the operation performer 615. The buffer in read or write 616, which is a buffer in communication with an external apparatus such as a shared resource apparatus, refers to a buffer including data which is transmitted to or received from the external apparatus. For example, the buffer in read or write 616 may be a buffer connected to a bus interface Bus I/F in order to communicate with a shared resource apparatus.

Referring to FIG. 8A, the priority determiner 621 included in the shared resource access arbitration apparatus 620 may determine priority based on buffer occupancy of an input buffer 810.

For example, referring to a buffer occupancy-priority graph 811, when buffer occupancy of a buffer in read from among the buffer in read or write 616 included in the master apparatus 610 is empty, the priority determiner 621 may determine a priority of the master apparatus 610 to be higher than that of a latency-sensitive master apparatus. When buffer occupancy of the buffer in read included in the master apparatus 610 is full, the priority determiner 621 may determine a priority of the master apparatus 610 to be lower than that of the latency-sensitive master apparatus. Particularly, as buffer occupancy increases, the priority determiner 621 may linearly decrease priority of the master apparatus 610.

Referring to a buffer occupancy-priority graph 814, when buffer occupancy related to the buffer in processing 617 included in the master apparatus 610 is empty, the priority determiner 621 may determine a priority of the master apparatus 610 to be higher than that of a latency-sensitive master apparatus. When buffer occupancy of the buffer in processing 617 included in the master apparatus 610 is full, the priority determiner 621 may set a priority of the master apparatus 610 to be lower than that of the latency-sensitive master apparatus. Particularly, as buffer occupancy increases, the priority determiner 621 may linearly decrease priority of the master apparatus 610. In this regard, buffer occupancy of the buffer in processing 617 may be defined as a ratio of valid data to a buffer size, the valid data not yet used in an operation. For example, some data from among data stored in a buffer is already related to an internal operation (or processing) and already used, and the other data may be data waiting for use in connection with an internal operation (or processing). Data that an internal operation (or processing) has already been substantially performed on has little to do with a stall phenomenon of a master apparatus and thus may not be considered, and accordingly, buffer occupancy of the buffer in processing 617 may be defined as a proportion of data that is not yet used in an operation.

For example, referring to a buffer occupancy-priority graph 812, when buffer occupancy of a buffer in read from among the buffer in read or write 616 included in the master apparatus 610 is empty, the priority determiner 621 may determine a priority of the master apparatus 610 to be higher than that of a latency-sensitive master apparatus. As buffer occupancy of the buffer in read from among the buffer in read or write 616 included in the master apparatus 610 increases, the priority determiner 621 may linearly decrease priority of the master apparatus 610. When occupancy of the buffer in read is equal to or greater than a certain value, priority of the master apparatus 610 may be a predetermined first value.

For example, referring to a buffer occupancy-priority graph 815, when buffer occupancy of the buffer in processing 617 included in the master apparatus 610 is empty, the priority determiner 621 may determine a priority of the master apparatus 610 to be higher than that of a latency-sensitive master apparatus. As buffer occupancy of the buffer in processing 617 included in the master apparatus 610 increases, the priority determiner 621 may linearly decrease priority of the master apparatus 610. When occupancy of the buffer in processing 617 is equal to or greater than a certain value, priority of the master apparatus 610 may be a predetermined first value.

For example, referring to a buffer occupancy-priority graph 813, when buffer occupancy of a buffer in read from among the buffer in read or write 616 included in the master apparatus 610 is empty, the priority determiner 621 may determine a priority of the master apparatus 610 to be higher than that of a latency-sensitive master apparatus. Regardless of an increase in buffer occupancy of the buffer in read from among the buffer in read or write 616 included in the master apparatus 610, the priority determiner 621 may determine priority of the master apparatus 610 to be a predetermined first value. When occupancy of the buffer in read from among the buffer in read or write 616 is equal to or greater than a certain value, the priority determiner 621 may determine a priority to be lower than that of the latency-sensitive master apparatus. In this regard, regardless of a continuous increase in the buffer occupancy of the buffer in read from among the buffer in read or write 616 from the certain value, the priority determiner 621 may determine priority of the master apparatus 610 to be a predetermined second value.

For example, referring to a buffer occupancy-priority graph 816, when buffer occupancy of the buffer in processing 617 included in the master apparatus 610 is empty, the priority determiner 621 may determine a priority of the master apparatus 610 to be higher than that of a latency-sensitive master apparatus. Regardless of an increase in buffer occupancy of the buffer in processing 617 included in the master apparatus 610, the priority determiner 621 may determine priority of the master apparatus 610 to be a predetermined first value. When occupancy of the buffer in processing 617 is equal to or greater than a certain value, the priority determiner 621 may determine a priority to be lower than that of the latency-sensitive master apparatus. In this regard, regardless of a continuous increase in the buffer occupancy of the buffer in processing 617 from the certain value, the priority determiner 621 may determine priority of the master apparatus 610 to be a predetermined second value.

Priority of the master apparatus 610 may be determined by combining buffer status information related to the buffer in read or write 616 and the buffer in processing 617. For example, when occupancy of a buffer in read is A, and occupancy of the buffer in processing 617 is B, min(A, B), max(A, B), or average(A, B) may be determined as buffer occupancy, and priorities of shared resource access requests may be determined based on the determined buffer occupancy.

Referring to FIG. 8B, the priority determiner 621 included in the shared resource access arbitration apparatus 620 may determine priority based on buffer occupancy of an output buffer 820.

For example, referring to a buffer occupancy-priority graph 821, when buffer occupancy of a buffer in write from among the buffer in read or write 616 included in the master apparatus 610 is empty, the priority determiner 621 may determine a priority of the master apparatus 610 to be lower than that of a latency-sensitive master apparatus. When buffer occupancy of the buffer in write from among the buffer in read or write 616 included in the master apparatus 610 is full, the priority determiner 621 may determine a priority of the master apparatus 610 to be higher than that of the latency-sensitive master apparatus. Particularly, as buffer occupancy increases, the priority determiner 621 may linearly increase priority of the master apparatus 610.

Referring to a buffer occupancy-priority graph 824, when buffer occupancy related to the buffer in processing 617 included in the master apparatus 610 is empty, the priority determiner 621 may determine a priority of the master apparatus 610 to be lower than that of a latency-sensitive master apparatus. When buffer occupancy of the buffer in processing 617 included in the master apparatus 610 is full, the priority determiner 621 may set a priority of the master apparatus 610 to be higher than that of the latency-sensitive master apparatus. Particularly, as buffer occupancy increases, the priority determiner 621 may linearly increase priority of the master apparatus 610.

For example, referring to a buffer occupancy-priority graph 822, when buffer occupancy of a buffer in write from among the buffer in read or write 616 included in the master apparatus 610 is less than a certain value (empty), the priority determiner 621 may determine priority of the master apparatus 610 to be a predetermined first value that is less than priority of a latency-sensitive master apparatus.

As buffer occupancy of the buffer in write from among the buffer in read or write 616 included in the master apparatus 610 increases from the certain value, the priority determiner 621 may linearly increase priority of the master apparatus 610.

For example, referring to a buffer occupancy-priority graph 825, when buffer occupancy of the buffer in processing 617 included in the master apparatus 610 is less than a certain value (empty), the priority determiner 621 may determine priority of the master apparatus 610 to be a predetermined first value that is less than priority of a latency-sensitive master apparatus. As buffer occupancy of the buffer in processing 617 included in the master apparatus 610 increases from the certain value, the priority determiner 621 may linearly increase priority of the master apparatus 610.

For example, referring to a buffer occupancy-priority graph 823, when buffer occupancy of a buffer in write from among the buffer in read or write 616 included in the master apparatus 610 is less than a certain value (empty), the priority determiner 621 may determine priority of the master apparatus 610 to be a predetermined first value that is less than priority of a latency-sensitive master apparatus. When occupancy of the buffer in write from among the buffer in read or write 616 is equal to or greater than a certain value, the priority determiner 621 may determine a priority to be higher than that of the latency-sensitive master apparatus. In this regard, regardless of a continuous increase in the buffer occupancy of the buffer in write from among the buffer in read or write 616 from the certain value, the priority determiner 621 may determine priority of the master apparatus 610 to be a predetermined second value.

For example, referring to a buffer occupancy-priority graph 826, when buffer occupancy of the buffer in processing 617 included in the master apparatus 610 is empty, the priority determiner 621 may determine a priority of the master apparatus 610 to be lower than that of a latency-sensitive master apparatus. When buffer occupancy of the buffer in processing 617 included in the master apparatus 610 is equal to or less than a certain value, the priority determiner 621 may determine priority of the master apparatus 610 to be a predetermined first value regardless of an increase in the buffer occupancy. When occupancy of the buffer in processing 617 reaches a certain value, the priority determiner 621 may determine a priority to be higher than that of the latency-sensitive master apparatus. In this regard, regardless of a continuous increase in the buffer occupancy of the buffer in processing 617 from the certain value, the priority determiner 621 may determine priority of the master apparatus 610 to be a predetermined second value.

Priority of the master apparatus 610 may be determined by combining buffer status information related to a write buffer from among the buffer in read or write 616 and the buffer in processing 617. For example, when occupancy of the write buffer from among the buffer in read or write 616 is A, and occupancy of the buffer in processing 617 is B, min(A, B), max(A, B), or average(A, B) may be determined as buffer occupancy, and priorities of shared resource access requests may be determined based on the determined buffer occupancy.

Although it has been described above with reference to the buffer occupancy-priority graphs 811-816 and 821-826 that the shared resource access arbitration apparatus 620 determines priorities of shared resource access requests, the present disclosure is not limited thereto, and the shared resource access arbitration apparatus 620 may determine a priority of a shared resource access request based on a correlation between various buffer occupancies and priority.

Although it has been assumed for convenience of description that the priority determiner 621 determines priority of a latency-sensitive master apparatus to be static, the present disclosure is not limited thereto, and the priority determiner 621 may change priority of the latency-sensitive master apparatus according to buffer occupancy.

Although the priority determiner 621 has been described above as receiving only buffer status information related to a buffer included in the throughput-sensitive master apparatus 610 and determining a priority of a shared resource access request based on only the received buffer status information, the present disclosure is not limited thereto, and the priority determiner 621 may receive buffer status information related to a buffer included in a latency-sensitive master apparatus and may determine a priority of a shared resource access request based on the received buffer status information.

Although the priority determiner 621 has been described as determining a priority of a shared resource access request based on buffer status information related to one of the input buffer 810 and the output buffer 820, the present disclosure is not limited thereto, and the priority determiner 621 may determine a priority of a shared resource access request based on buffer status information of the input buffer 810 and buffer status information of the output buffer 820.

FIGS. 9A to 10B each are timing diagrams showing a process of processing a shared resource access request of a throughput-sensitive master apparatus, according to an embodiment of the present invention.

Figure 9A:
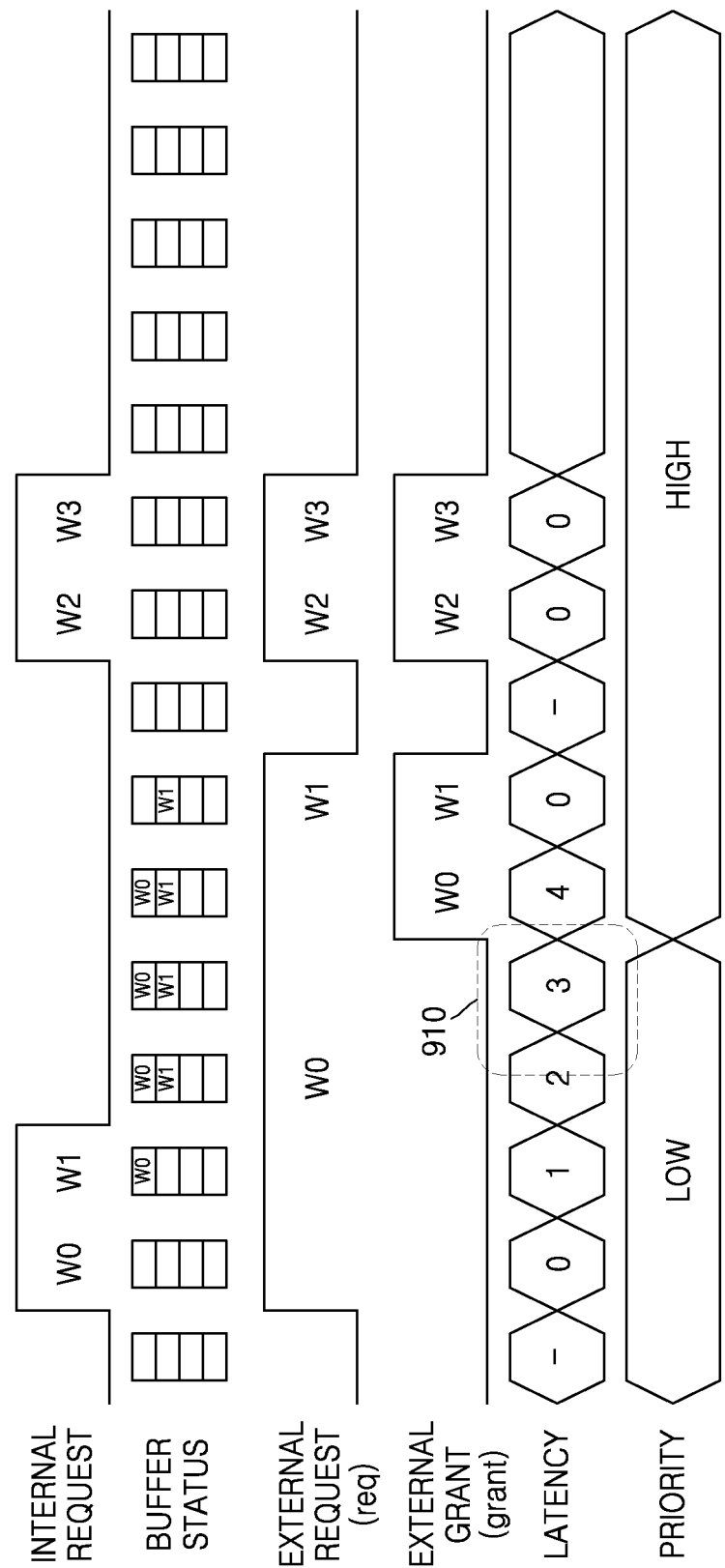
FIGS. 9A and 9B each are timing diagrams showing a process of processing a shared resource access request of a throughput-sensitive master apparatus when a chance of occurrence of a stall phenomenon of the throughput-sensitive master apparatus is low, according to an embodiment of the present invention.
Figure 9B:
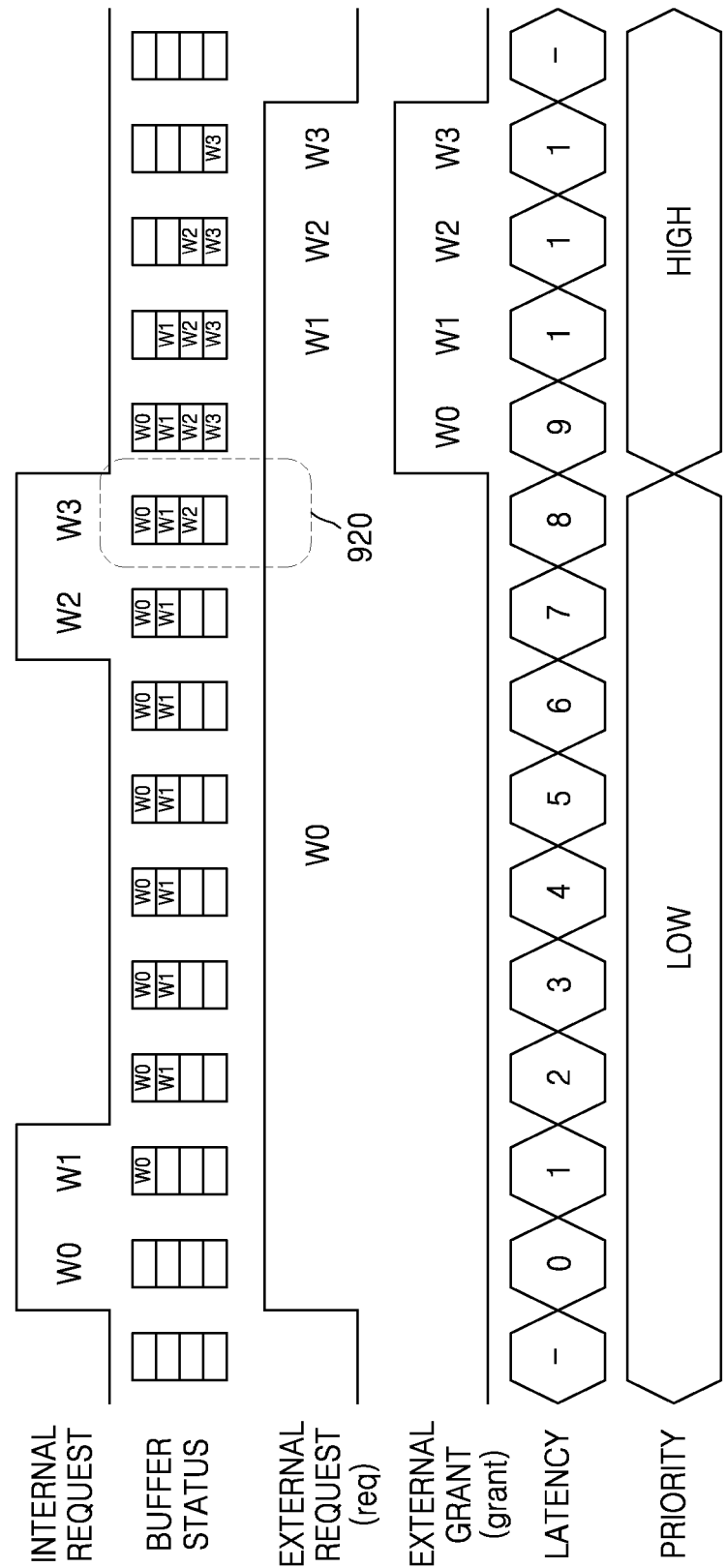
Figure 10A:
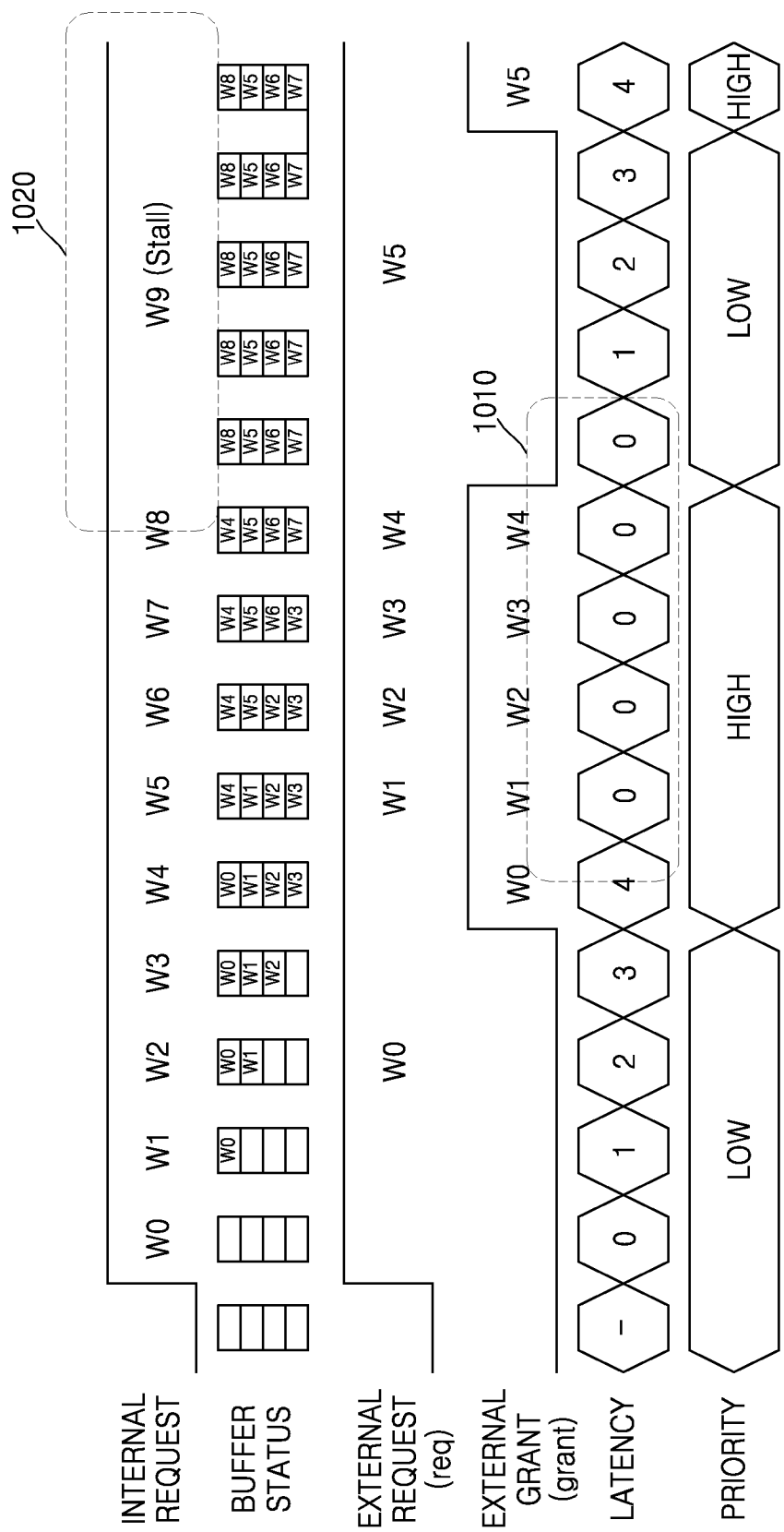
FIGS. 10A and 10B are each timing diagrams showing a process of processing a shared resource access request when a chance of occurrence of a stall phenomenon of a throughput-sensitive master apparatus is high, according to an embodiment of the present invention.
Figure 10B:
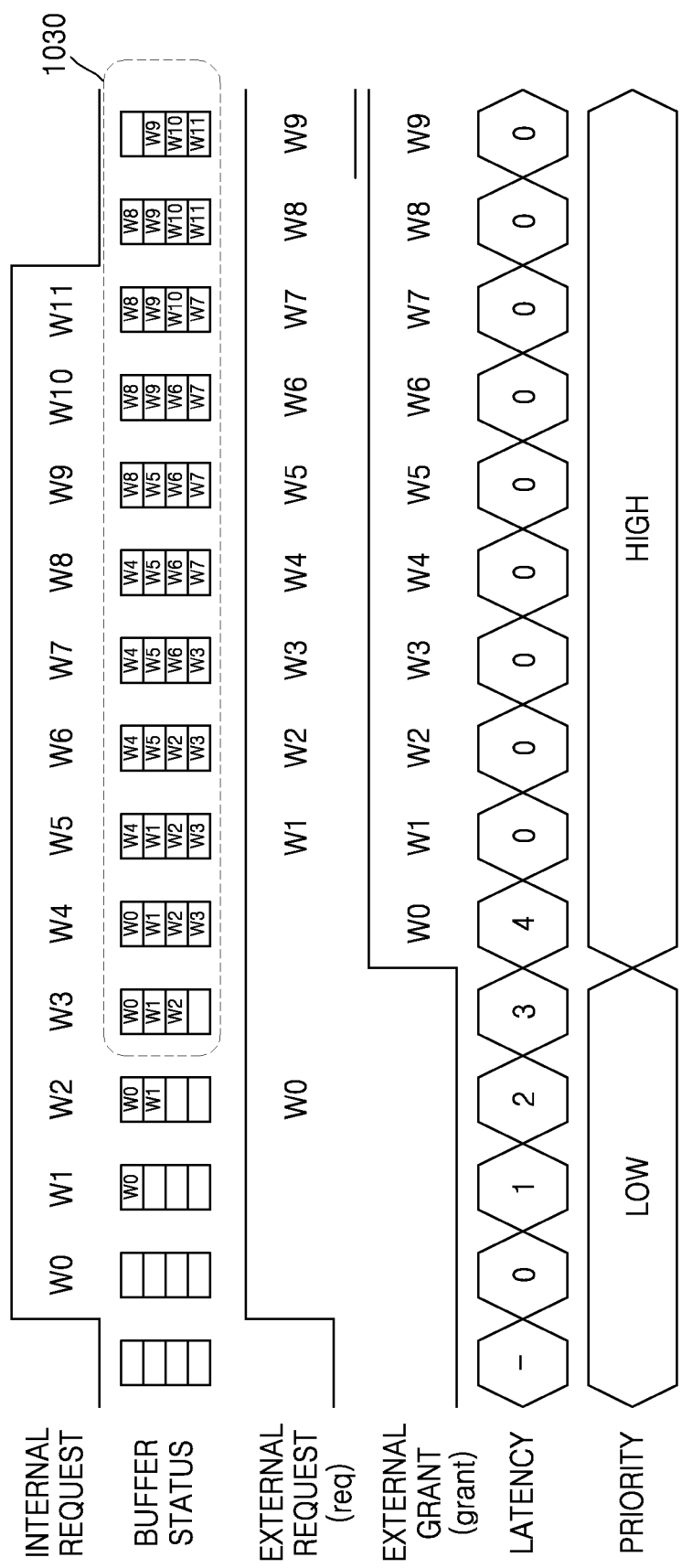

FIGS. 9A and 9B each show a process of processing a shared resource access request of a throughput-sensitive master apparatus when a chance of occurrence of a stall phenomenon of the throughput-sensitive master apparatus is low, that is, when the throughput-sensitive master apparatus intends to access a shared resource apparatus a relatively fewer times over a certain period of time, according to an embodiment of the present invention, whereas FIGS. 10A and 10B each show a process of processing a shared resource access request of a throughput-sensitive master apparatus when a chance of occurrence of a stall phenomenon of the throughput-sensitive master apparatus is high, that is, when the throughput-sensitive master apparatus intends to access a shared resource apparatus a relatively more times over a certain period of time, according to an embodiment of the present invention.

FIGS. 9A and 9B each are timing diagrams showing a process of processing a shared resource access request of a throughput-sensitive master apparatus when a chance of occurrence of a stall phenomenon of the throughput-sensitive master apparatus is low, according to an embodiment of the present invention.

Regarding FIG. 9A, a shared resource access arbitration apparatus is assumed to determine priorities of shared resource access requests received from master apparatuses based on latency of the throughput-sensitive master apparatus 610. Regarding FIG. 9B, the shared resource access arbitration apparatus determines priorities of shared resource access requests received from master apparatuses based on buffer status information related to an output buffer included in the throughput-sensitive master apparatus 610.

Referring to FIG. 9A, the throughput-sensitive master apparatus 610 generates a shared resource access request. For example, the throughput-sensitive master apparatus 610 is synchronized by an internal clock to generate shared resource access request 'W0, W1, W2, W3'. Hereinafter, a shared resource access request that is generated in a master apparatus to access a shared resource apparatus will be referred to as an internal request.

When the throughput-sensitive master apparatus 610 generates the shared resource access request 'W0, W1, W2, W3', the throughput-sensitive master apparatus 610 may first store the shared resource access request in an output buffer and may transmit the shared resource access request stored in the output buffer to a shared resource access arbitration apparatus. Hereinafter, a shared resource access request that is transmitted to a shared resource access arbitration apparatus outside the master apparatus will be referred to as an external request. The external request may be continuously transmitted from the master apparatus 610 to the shared resource access arbitration apparatus until a grant message gnt is received.

When the shared resource access arbitration apparatus receives an external request req from the throughput-sensitive master apparatus 610, the shared resource access arbitration apparatus may transmit the grant message gnt to the throughput-sensitive master apparatus 610 based on priority between other external requests.

Referring to FIG. 9A, priority of the throughput-sensitive master apparatus 610 is low, and thus, the grant message gnt is transmitted with respect to shared resource access requests of other master apparatuses first. Accordingly, latency of the throughput-sensitive master apparatus 610 gradually increases.

When the latency satisfies a predetermined latency condition 910, the shared resource access arbitration apparatus determines priority of the external request req received from the throughput-sensitive master apparatus 610 to be high.

Accordingly, the shared resource access arbitration apparatus may transmit an external grant gnt to the throughput-sensitive master apparatus 610 as priority of the external request req is determined to be high.

Because priority of the throughput-sensitive master apparatus 610 is high, the shared resource access arbitration apparatus may also transmit the grant message gnt with respect to the following external request req received from the throughput-sensitive master apparatus 610.

Referring to FIG. 9B, the throughput-sensitive master apparatus 610 is assumed to generate an internal request which is the same as that shown in FIG. 9A.

Unlike that shown in FIG. 9A, although a shared resource access request received from another master apparatus having a high priority is first processed in the shared resource access arbitration apparatus, and thus, latency of the throughput-sensitive master apparatus 610 increases, priority of the external request req is not changed.

When status of an output buffer satisfies a predetermined buffer status condition 920, the shared resource access arbitration apparatus changes priority of the external request req transmitted by the master apparatus 610. Accordingly, the shared resource access arbitration apparatus may transmit the grant message gnt regarding the external request req transmitted by the master apparatus 610 to the throughput-sensitive master apparatus 610. Also, since priority of the external request req transmitted by the master apparatus 610 is high, the shared resource access arbitration apparatus may also transmit the grant message gnt regarding the following external request req transmitted by the master apparatus 610.

Although an internal request that the throughput-sensitive master apparatus 610 of FIG. 9B processes is the same as the internal request of FIG. 9A, a time at which the shared resource access arbitration apparatus grants the external request req is different according to different priority determination standard, and thus, a time at which the external request req is finally processed is different.

Particularly, as shown in FIG. 9B, when a priority of a shared resource access request is determined based on buffer status information of an output buffer, priority is not changed until the buffer is completely filled with data and thus a master apparatus is unable to perform processing anymore, and the shared resource access arbitration apparatus may grant a shared resource access request received from a latency-sensitive master apparatus so that a chance of a stall of the latency-sensitive master apparatus may be reduced. That is, by overly estimating a chance of a stall of the throughput-sensitive master apparatus 610, a chance of a stall of other latency-sensitive master apparatuses may be prevented from increasing.

FIGS. 10A and 10B are each timing diagrams showing a process of processing a shared resource access request when a chance of occurrence of a stall phenomenon of a throughput-sensitive master apparatus is high, according to an embodiment of the present invention.

Regarding FIG. 10A, a shared resource access arbitration apparatus is assumed to determine priorities of shared resource access requests received from master apparatuses based on latency of the throughput-sensitive master apparatus 610. Regarding FIG. 10B, the shared resource access arbitration apparatus determines priorities of shared resource access requests received from master apparatuses based on buffer status information related to an output buffer included in the throughput-sensitive master apparatus 610.

Referring to FIG. 10A, the throughput-sensitive master apparatus 610 generates a shared resource access request. For example, the throughput-sensitive master apparatus 610 may be synchronized by an internal clock to transmit shared resource access request 'W0, W1, W2, W3, W4, . . . , W9'. Hereinafter, a shared resource access request that is generated in a master apparatus to access a shared resource apparatus will be referred to as an internal request.

When the throughput-sensitive master apparatus 610 generates the shared resource access request 'W0, W1, W2, W3, W4, . . . , W9', the throughput-sensitive master apparatus 610 may first store the shared resource access request in an output buffer and may transmit the shared resource access request stored in the output buffer to a shared resource access arbitration apparatus. Hereinafter, a shared resource access request that is transmitted to a shared resource access arbitration apparatus outside the master apparatus will be referred to as an external request. The external request may be continuously transmitted from the master apparatus 610 to the shared resource access arbitration apparatus until a grant message gnt is received.

When the shared resource access arbitration apparatus receives a shared resource access request from the throughput-sensitive master apparatus 610, the shared resource access arbitration apparatus may transmit the grant message gnt regarding one shared resource access request based on priority between a shared resource access request received from another master apparatus and shared resource access requests received from the master apparatus 610. Referring to FIG. 9A, priority of the throughput-sensitive master apparatus 610 is low, and thus, the grant message gnt is transmitted with respect to shared resource access requests of other master apparatuses first. Accordingly, latency of the throughput-sensitive master apparatus 610 gradually increases.

As the latency increases (0, 1, 2, 3), the shared resource access arbitration apparatus determines priority of the external request received from the throughput-sensitive master apparatus 610 to be high.

As priority of the external request received from the throughput-sensitive master apparatus 610 increases, the shared resource access arbitration apparatus may continuously grant the external request req (W0, W1, W2, W3, W4) received from the throughput-sensitive master apparatus 610. With the continuous grant, the latency decreases. Accordingly, the shared resource access arbitration apparatus may satisfy a predetermined latency condition 1010 and thus may decrease priority of the external request req received from the master apparatus 610 (Low).

When priority of the external request req received from the master apparatus 610 decreases, the shared resource access arbitration apparatus grants a shared resource access request received from another master apparatus, and does not grant the external request req (W5, W6,) of the throughput-sensitive master apparatus 610. As the external request req is not granted, the throughput-sensitive master apparatus 610 continuously stores the internal request in the output buffer (W5, W6, W7, W8). However, when the internal request is stored enough to completely fill a space of the buffer, the throughput-sensitive master apparatus 610 is unable to store the internal request W9 in the buffer because there is no space left in the buffer after the internal request W9 1020 is generated. Accordingly, the throughput-sensitive master apparatus 610 has a stall phenomenon.

Referring to FIG. 10B, the shared resource access arbitration apparatus determines priority based on status of a buffer. When status of the buffer satisfies a predetermined condition (a case in which three requests are included in a buffer which four internal requests go into), the shared resource access arbitration apparatus may change priority of the external request req received from the master apparatus 610 to be high. Accordingly, the shared resource access arbitration apparatus grants the external request req of the throughput-sensitive master apparatus 610 earlier than a shared resource access request of another master apparatus. After the grant, the shared resource access arbitration apparatus does not change priority of the external request req received from the master apparatus 610 based on buffer status 1030. In this regard, the buffer status 1030 is status where, when an internal request is generated, the generated internal request may continue to be stored in the buffer.

The shared resource access arbitration apparatus according to an embodiment of the present invention may estimate a chance of a stall of a throughput-sensitive master apparatus by using buffer status information related to an internal buffer.

As shown in FIG. 10A, when priority of an external request received from the master apparatus 610 is determined based on latency, a chance of occurrence of a stall of a master apparatus is underestimated, whereas, in the case of FIG. 10B, underestimation of a chance of a stall of the master apparatus 610 may be prevented.

Figure 11A:
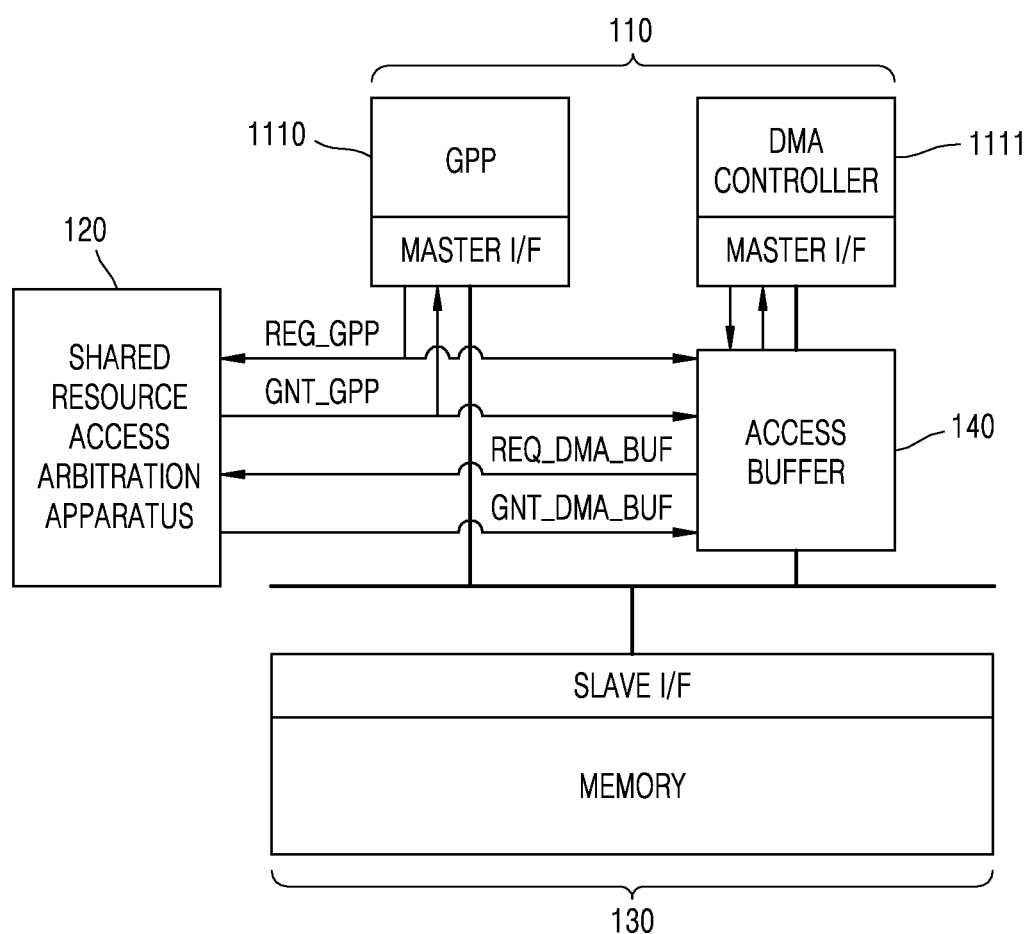
FIGS. 11A and 11B each are diagrams showing a process of determining a priority of a shared resource access request received in a shared resource access arbitration apparatus by additionally using an access buffer, according to an embodiment of the present invention.
Figure 11B:
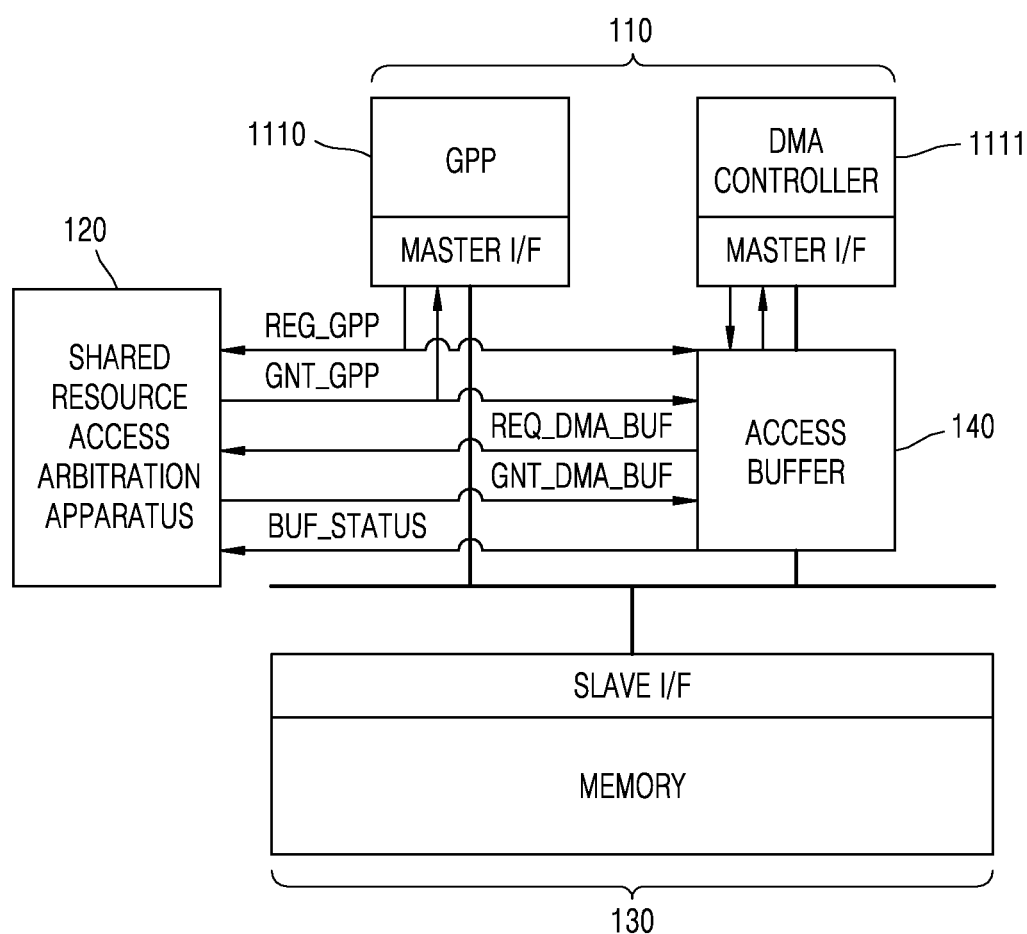

FIGS. 11A and 11B each are diagrams showing a process of determining a priority of a shared resource access request received in a shared resource access arbitration apparatus by additionally using an access buffer, according to an embodiment of the present invention.

Referring to FIGS. 11A and 11B, the access buffer 140 is additionally present. The access buffer 140 buffers a shared resource access request of a DMA controller 1111 directly connected thereto. Particularly, the access buffer 140 may be between a throughput-sensitive master apparatus such as the DMA controller 1111 and the memory 130 and may be directly connected thereto, respectively. Particularly, a bus connected to the DMA controller 1111 is connected to the access buffer 140 and a bus connected to the memory 130 is connected to the access buffer 140 so that the access buffer 140 may arbitrate transmission of a shared resource access request and data transmission and reception.

Referring to FIG. 11A, the shared resource access arbitration apparatus 120 may determine a priority of a shared resource access request based on predetermined priority. The shared resource access arbitration apparatus 120 may determine a priority of a shared resource access request based on various conditions. For example, the shared resource access arbitration apparatus 120 may determine a priority of a shared resource access request based on latency of the master apparatuses 110.

The access buffer 140 may directly control a shared resource access request. For example, the access buffer 140 determines whether to store a shared resource access request received from the DMA controller 1111 based on a shared resource access request req_gpp of the GPP 1110 and buffer status information of the access buffer 140 (for example, whether the buffer has an empty space). In some cases, a shared resource access request req_dma received from the DMA controller 1111 may be bypassed.

The access buffer 140 transmits a shared resource access request req_dma_buf stored in the buffer or bypassed to the shared resource access arbitration apparatus 120, and the shared resource access arbitration apparatus 120 determines priority of the received shared resource access requests req_dma_buf and req_gpp and grants one shared resource access request gnt_gpp or gnt_dma_buf according to the determined priority.

If the access buffer 140 receives the grant message gnt_dma_buf regarding the shared resource access request req_dma_buf, the access buffer 140 transmits the shared resource access request stored or bypassed to the memory 130. Accordingly, the DMA controller 1111 may access the memory 130.

By adding the access buffer 140, when a shared resource access request received from a latency-sensitive master apparatus such as the GPP 1110 is transmitted to the shared resource access arbitration apparatus 120, a shared resource access request received from a throughput-sensitive master apparatus such as the DMA controller 1111 is stored in the access buffer 140. Also, the access buffer 140 transmits the stored shared resource access request to the shared resource access arbitration apparatus 120 according to status of the access buffer 140.

As the access buffer 140 stores a shared resource access request, a phenomenon in which priority within the shared resource access arbitration apparatus 120 is reversed, the phenomenon occurring when a shared resource access request received from a master apparatus connected to the access buffer 140 is directly transmitted, may be prevented.

Also, due to the presence of the access buffer 140, shared resource access requests may be temporally separated from each other, and thus, a bank conflict which occurs as a result of a conflict with a shared resource access request received from another master apparatus may be prevented. That is, by preventing the bank conflict, a response time of a latency-sensitive master apparatus may be improved and a throughput of a throughput-sensitive master apparatus may be maintained.

A detailed structure of the access buffer shown in FIG. 11A will be described below with reference to FIG. 12.

Referring to FIG. 11B, when the access buffer 140 receives a shared resource access request received from the DMA controller 1111, the access buffer 140 stores the shared resource access request. The access buffer 140 transmits buffer status information buf_status to the shared resource access arbitration apparatus 120. The access buffer 140 transmits a stored resource access request req_dma_buf to the shared resource access arbitration apparatus 120, and the shared resource access arbitration apparatus 120 determines priorities of shared resource access requests based on buffer status information of a buffer received from the access buffer 140. Particularly, the shared resource access arbitration apparatus 120 may dynamically change a priority of a shared resource access request based on buffer status information of a buffer received from the access buffer 140.

The shared resource access arbitration apparatus 120 grants one of the shared resource access requests according to the determined priority.

The shared resource access arbitration apparatus 120 may prevent a stall of a master apparatus by dynamically changing priorities of shared resource access requests based on buffer status information of the access buffer 140.

A detailed structure of the access buffer shown in FIG. 11B will be described below with reference to FIG. 13.

Figure 12:
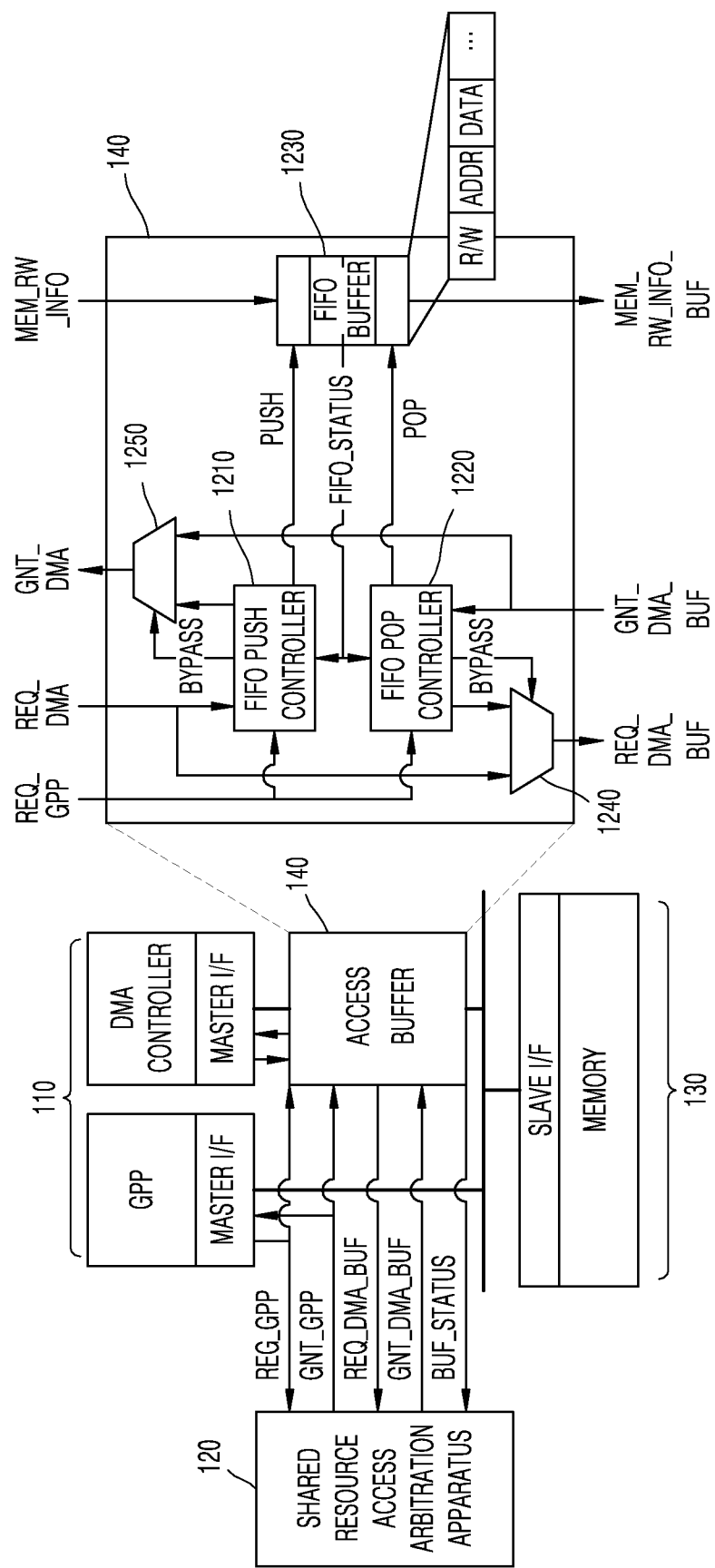
FIG. 12 is a diagram showing a process in which a master apparatus accesses a shared resource apparatus by using an access buffer that takes a shared resource access request of another master apparatus into account, according to an embodiment of the present invention.
Figure 13:
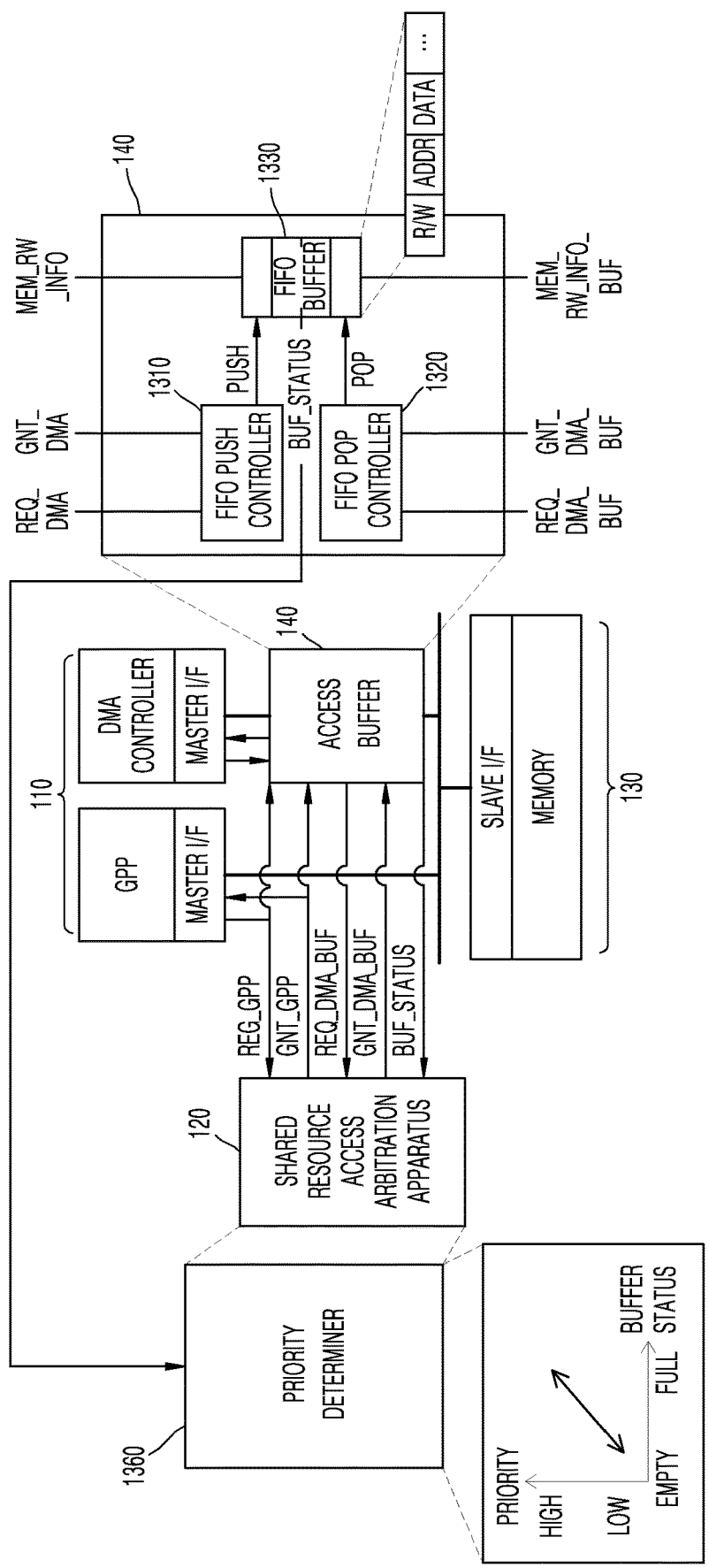
FIG. 13 is a diagram showing a process in which a master apparatus accesses a shared resource apparatus according to a priority of a shared resource access request dynamically determined based on a status of an access buffer, according to an embodiment of the present invention.

FIGS. 12 and 13 each are diagrams showing a process in which a master apparatus accesses a shared resource apparatus by using an access buffer, according to an embodiment of the present invention.

Unlike the access buffer 140 shown in FIG. 12, the access buffer 140 shown in FIG. 13 does not include a MUX. Accordingly, a shared resource access request received from a master apparatus may be stored in the access buffer 140 without being bypassed.

FIG. 12 is a diagram showing a process in which a master apparatus accesses a shared resource apparatus by using an access buffer that takes a shared resource access request of another master apparatus into account, according to an embodiment of the present invention.

The shared resource access arbitration apparatus 120 is assumed to grant one shared resource access request according to predetermined priority when the shared resource access arbitration apparatus 120 receives shared resource access requests from the master apparatuses 110 in order to arbitrate access of a shared resource apparatus.

Referring to FIG. 12, the access buffer 140 includes a first in first out (FIFO) push controller 1210, an FIFO pop controller 1220, an FIFO buffer 1230, a MUX 1240, and a MUX 1250.

The access buffer 140 receives a shared resource access request req_dma from the throughput-sensitive DMA controller 1111. In this regard, when the FIFO push controller 1210 receives the received shared resource access request req_dma, the FIFO push controller 1210 determines whether to push the shared resource access request req_dma into the FIFO buffer based on a shared resource access request req_gpp received from another processor and buffer status information fifo_status related to the FIFO buffer 1230. In this regard, the access buffer 140 may transmit a grant gnt_dma regarding the shared resource access request req_dma to the master apparatus as if the shared resource access arbitration apparatus 120 granted the shared resource access request req_dma.

If the access buffer 140 determines to push the shared resource access request req_dma into the FIFO buffer 1230, the FIFO buffer 1230 stores a shared resource access request mem_rw_info for being transmitted to the memory 130. In this regard, the shared resource access request mem_rw_info is related to the shared resource access request req_dma.

The shared resource access request req_dma, which is a message that is transmitted to the shared resource access arbitration apparatus 120, is a message that requests the shared resource apparatus for access authority in order to obtain access authority regarding the shared resource apparatus. The shared resource access request mem_rw_info, which is a message including an access command for accessing the shared resource apparatus, may include, for example, whether to read or write (r/w), a shared resource apparatus address (addr), and data (data). The FIFO buffer 1230 is not limited to storing only the shared resource access request mem_rw_info related to the shared resource access request req_dma, and may also store the shared resource access request req_dma.

The FIFO pop controller 1220 may determine whether to pop the shared resource access request mem_rw_info stored in the FIFO buffer 1230 based on the shared resource access request req_gpp and the buffer status information fifo_status of the buffer. The FIFO pop controller 1220 transmits a message including a pop command to the FIFO buffer 1230 so that a shared resource access request stored in the FIFO buffer 1230 may pop. A first stored shared resource access request from among the stored shared resource access request mem_rw_info is popped, and the related shared resource access request req_dma is transmitted to the shared resource access arbitration apparatus 120 as the shared resource access request req_dma_buf. When the grant message gnt_dma_buf regarding the transmitted shared resource access request req_dma_buf is received, a stored shared resource access request mem_rw_info_buf may be transmitted to the memory 130 based on the received grant message gnt_dma_buf.

In detail, when there is no request from another master apparatus (when no req_gpp signal is received) and there is no stored request (when fifo_status includes information indicating that there is no shared resource access request stored in the FIFO buffer), the FIFO push controller 1210 bypasses a shared resource access request. Likewise, when there is no request from another master apparatus (when no req_gpp signal is received) and there is no stored request (when fifo_status includes information indicating that there is no shared resource access request stored in the FIFO buffer), the FIFO pop controller 1220 bypasses a grant message regarding the shared resource access request.

When there is a request from another master apparatus (when a req_gpp signal is received) and there is an empty space in the FIFO buffer (when fifo_status includes information indicating that there is an empty space in the FIFO buffer), the FIFO push controller 1210 may control the shared resource access request req_dma to be stored in the FIFO buffer 1230.

When there is no request from another master apparatus (when no req_gpp signal is received) or there is no empty space in the FIFO buffer (when fifo_status includes information indicating that there is no empty space in the FIFO buffer), the FIFO pop controller 1220 may control the shared resource access request stored in the FIFO buffer 1230 to be transmitted to the shared resource access arbitration apparatus 120.

The MUX 1240 may determine one of the shared resource access request req_dma and the shared resource access request obtained in the FIFO pop controller 1220 based on a bypass signal. The determined one shared resource access request is transmitted to the shared resource access arbitration apparatus as the shared resource access request req_dma_buf. For example, when the bypass signal is '1' (in the case of bypass), the shared resource access request req_dma received from a master apparatus may not be stored and may be directly transmitted to the shared resource access arbitration apparatus as the shared resource access request req_dma_buf.

The MUX 1250 may determine one of the grant gnt_dma_buf regarding the shared resource access request and a grant message obtained in the FIFO push controller 1210 based on a bypass signal. The determined one grant message is transmitted to the master apparatus as the grant message gnt_dma. For example, when the bypass signal is '1' (in the case of bypass), the grant message gnt_dma_buf received from the shared resource access arbitration apparatus may be transmitted to the master apparatus as the grant message gnt_dma.

A detailed process of processing a shared resource access request by using the access buffer 140 shown in FIG. 12 according to time will be described below with reference to FIG. 14.

FIG. 13 is a diagram showing a process in which a master apparatus accesses a shared resource apparatus according to a priority of a shared resource access request dynamically determined based on a status of an access buffer, according to an embodiment of the present invention.

The access buffer 140 includes an FIFO push controller 1310, an FIFO pop controller 1320, and an FIFO buffer 1330.

When the FIFO push controller 1310 receives a received shared resource access request req_dma, the FIFO push controller 1310 determines whether to push the shared resource access request req_dma into the FIFO buffer based on the buffer status information fifo_status related to the FIFO buffer 1330. For example, when there is an empty space in the FIFO buffer 1330, the shared resource access request req_dma may be controlled to be stored in the FIFO buffer 1330. When the access buffer 140 determines to push the shared resource access request req_dma into the FIFO buffer 1330, the FIFO buffer 1330 stores the shared resource access request mem_rw_info for being transmitted to the memory 130. In this regard, the shared resource access request mem_rw_info is related to the shared resource access request req_dma.

The FIFO pop controller 1320 may determine whether to pop the shared resource access request mem_rw_info stored in the FIFO buffer 1330 based on the buffer status information fifo_status of the buffer. For example, when there is the shared resource access request mem_rw_info stored in the buffer, the FIFO pop controller 1330 may determine to pop the stored shared resource access request mem_rw_info.

When the FIFO pop controller 1320 pops a shared resource access request stored in the FIFO buffer 1330, a first stored shared resource access request from among the stored shared resource access request mem_rw_info is popped, and the related shared resource access request req_dma is transmitted to the shared resource access arbitration apparatus as the shared resource access request req_dma_buf. When the FIFO pop controller 1320 receives the grant message gnt_dma_buf regarding the transmitted shared resource access request req_dma_buf, the FIFO pop controller 1220 may control the stored shared resource access request mem_rw_info_buf to be transmitted to the memory 130 based on the received grant message gnt_dma_buf.

The shared resource access arbitration apparatus 120 includes a priority determiner 1360. The priority determiner 1360 receives buffer status information buf_status regarding the FIFO buffer from the FIFO buffer 1340 of the access buffer 140. The priority determiner 1360 may determine priority of a received shared resource access request based on the buffer status information buf_status. For example, when received buffer status information indicates that there is a lot of empty space in the FIFO buffer 1340, the priority determiner 1360 changes a priority of a shared resource access request received from a master apparatus connected to the access buffer 140 into low. On the other hand, when the buffer status information buf_status indicates that there is a little empty space in the FIFO buffer 1340, the priority determiner 1360 changes priority into high.

The present disclosure is not limited thereto, and the priority determiner 1360 may change priority of another master apparatus based on buffer status information. For example, when the buffer status information buf_status indicates that there is a lot of empty space in the FIFO buffer 1340, the priority determiner 1360 may change priority of not the master apparatus connected to the access buffer 140 but another master apparatus into high. On the other hand, when the buffer status information buf_status indicates that there is a little empty space, the priority determiner 1360 may change priority of not the master apparatus connected to the access buffer 140 but the other master apparatus into low.

The shared resource access arbitration apparatus 120 according to an embodiment of the present invention may dynamically adjust priority of a throughput-sensitive master apparatus connected to the access buffer 140 within a range where the buffer is not completely full based on buffer status information and thus may minimize a decrease in throughput and may control other latency-sensitive master apparatuses to operate without stalling.

Figure 14:
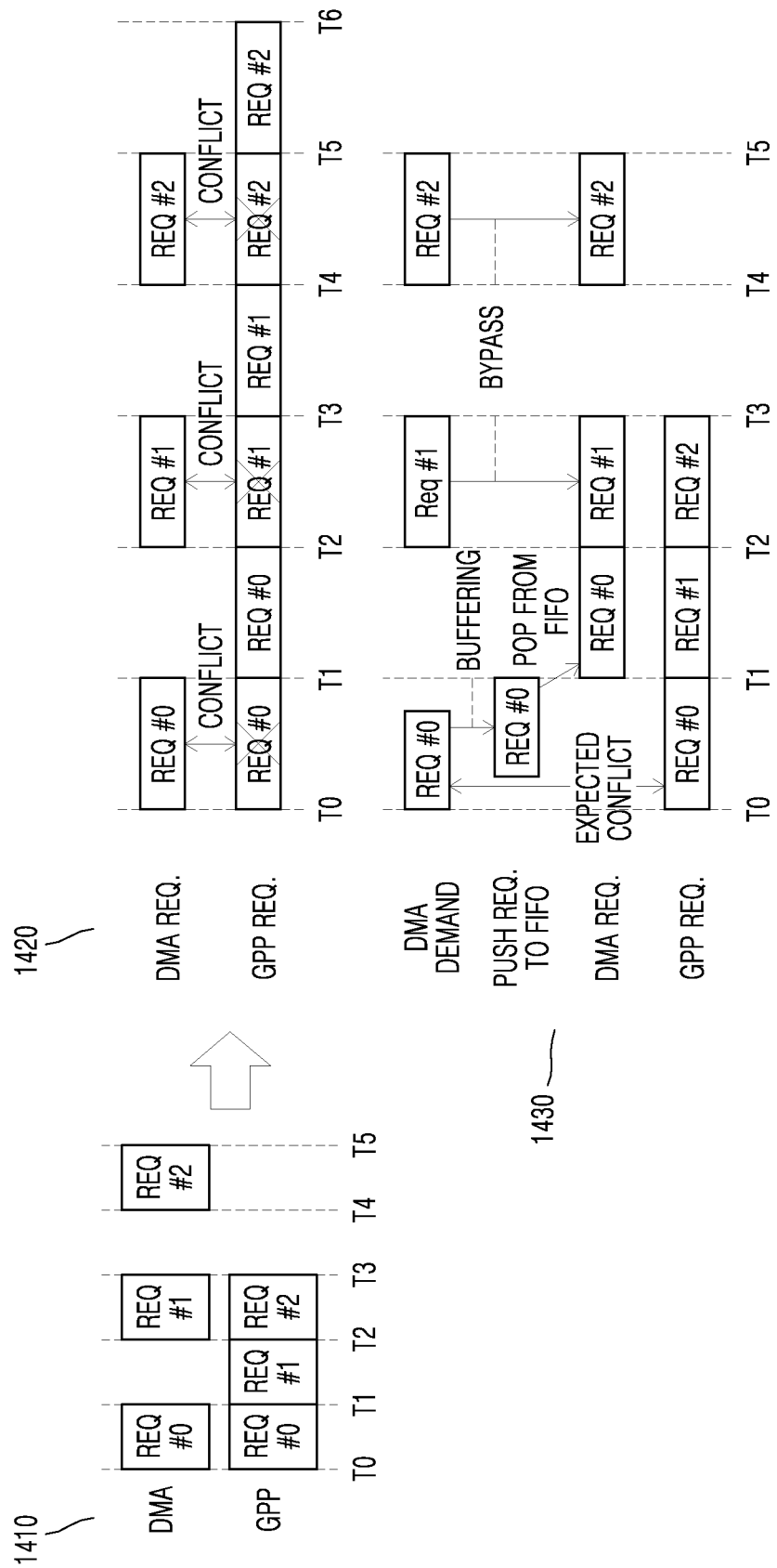
FIG. 14 is a timing diagram showing a process of processing a shared resource access request, according to an embodiment of the present invention.

FIG. 14 is a timing diagram showing a process of processing a shared resource access request, according to an embodiment of the present invention.

Referring to FIG. 14, the latency-sensitive GPP 1110 and the throughput-sensitive DMA controller 1111 are assumed to request access to 3-bank memory.

The GPP 1110 sequentially transmits shared access requests Req #0, Req #1, and Req #2 for accessing respective banks #0, #1, and #2 in T0-T1, T1-T2, and T2-T3 periods according to a memory transmission timing 1410. Likewise, the DMA controller 1111 sequentially transmits shared resource access requests Req #0, Req #1, and Req #2 for accessing respective banks #0, #1, and #2 in T0-T1, T2-T3, and T4-T5 periods according to the transmission timing 1410.

It is assumed that a timing diagram 1420 is a timing diagram showing a process of processing a shared resource access request when there is no access buffer 140, and a timing diagram 1430 is a timing diagram showing a process of processing a shared resource access request when there is the access buffer 140.

Referring to the timing diagram 1420, when the GPP 1110 and the DMA controller 1111 transmit shared resource access requests to the memory according to the transmission timing 1410, the shared resource access request Req #0 regarding the bank #0 transmitted by the GPP 1110 according to the transmission timing 1410 conflicts with the shared resource access request Req transmitted by the DMA controller 1111.

In this regard, the GPP 1110 is assumed not to have received a grant regarding a shared resource access request from a shared resource access arbitration apparatus. Accordingly, the GPP 1110 temporarily has a stall phenomenon, and the GPP 1110 transmits a shared resource access request not in the T0-T1 period but in the T1-T2 period. Likewise, a conflict also occurs in the T2-T3 period and the T4-T5 period. Likewise, the GPP 1110 temporarily has a stall phenomenon, and the GPP 1110 transmits the shared resource access requests Req#1 and Req#2 in the T3-T4 period and the T5-T6 period.

Referring to the timing diagram 1430, when the GPP 1110 and the DMA controller 1111 transmit shared resource access requests to the memory according to the transmission timing 1410, the shared resource access request Req #0 regarding the bank #0 transmitted by the GPP 1110 according to the transmission timing 1410 is simultaneously transmitted with the shared resource access request Req transmitted by the DMA controller 1111, and thus, a conflict may be expected to occur. Accordingly, the DMA controller 1111 stores the shared resource access request Req #0 in the access buffer. In the T1-T2 period, the DMA controller 1111 pops the stored shared resource access request Req #0. Since the shared resource access requests Req #1 and Req #2 of the DMA controller 1111 do not conflict with the shared resource access requests Req #1 and Req #2 of the GPP 1110, the DMA controller 1111 does not separately store the shared resource access requests Req #1 and Req #2 of the GPP 1110 in the buffer, and bypasses the shared resource access requests Req #1 and Req #2 of the GPP 1110.

Accordingly, in a case where there is no access buffer 140, when the latency-sensitive GPP 1110 transmits a shared resource access request according to the transmission timing 1410, a total of 6 cycles are required to transmit all shared resource access requests due to a stall phenomenon of 3 cycles. On the other hand, in a case where there is the access buffer 140, when the latency-sensitive GPP 1110 transmits a shared resource access request according to the transmission timing 1410, only a total of 3 cycles are required to transmit all shared resource access requests without the occurrence of a stall phenomenon, and thus, performance is improved compared to when there is no access buffer 140.

In a case where there is no access buffer 140, when the throughput-sensitive DMA controller 1111 transmits a shared resource access request according to the transmission timing 1410, the DMA controller 1111 processes three shared resource access requests until the T5 point. In a case where there is the access buffer 140, when the DMA controller 1111 transmits a shared resource access request according to the transmission timing 1410, the DMA controller 1111 processes three shared resource access requests until the T5 point. Accordingly, performance of the DMA controller 1111 in the case where there is no access buffer 140 and the case where there is the access buffer 140 stays the same.

That is, a conflict of shared resource access requests transmitted from master apparatuses is expected to occur, the access buffer 140 buffers a shared access request of a throughput-sensitive master apparatus such as the DMA controller 1111. Accordingly, a stall phenomenon of a latency-sensitive master apparatus such as the GPP 1110 may be prevented. Particularly, the stall phenomenon of the latency-sensitive master apparatus such as the GPP 1110 may be prevented within the extent to which performance of the throughput-sensitive master apparatus such as the DMA controller 1111 is not greatly decreased.

The terms such as "include," "comprise," and "have" used herein specify the presence of stated components, but do not preclude the presence or addition of one or more other components unless otherwise described.

The embodiments of the present invention can be written as computer programs and can be implemented in general-use digital computers that execute the programs using a computer-readable recording medium. Examples of the computer-readable recording medium include magnetic storage media (e.g., ROM, floppy disks, hard disks, etc.), and optical recording media (e.g., CD-ROMs, DVDs, etc.).

While the present invention has been particularly shown and described with reference to exemplary embodiments thereof, it will be understood by one of ordinary skill in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A shared resource access arbitration method of a shared resource access arbitration apparatus, the shared resource access arbitration method comprising:
receiving, from at least one master apparatus, buffer status information related to a buffer included in the at least one master apparatus;
determining, based on the received buffer status information, priorities of shared resource access requests received from a plurality of master apparatuses comprising the at least one master apparatus;
granting, according to the determined priorities of the shared resource access requests, one of the shared resource access requests having a high priority;
determining a data bus, from among data buses connected to the plurality of master apparatuses, connected to a master apparatus, from among the plurality of master apparatuses, the master apparatus having transmitted the granted shared resource access request, so that the master apparatus having transmitted the granted shared resource access request is allowed to access a shared resource apparatus; and arbitrating, via the determined data bus, data which is transmitted and received between the master apparatus having transmitted the granted shared resource access request and the shared resource apparatus, wherein the data buses connected to the plurality of master apparatuses and a data bus connected to the shared resource apparatus are connected to the shared resource access arbitration apparatus, wherein the data buses connected to the plurality of master apparatuses and the data bus connected to the shared resource apparatus are related to a data signal and are not related to control signals including a grant signal and a request signal, wherein the buffer is included in at least one processor in the at least one master apparatus, wherein the buffer comprises a first buffer comprising data which is transmitted to or received from an external apparatus and a second buffer comprising data related to internal processing of the at least one master apparatus and which is not directly connected to a bus interface, and wherein the determining, based on the received buffer status information, of the priorities of the shared resource access requests received from the plurality of master apparatuses comprising the at least one master apparatus comprises determining, based on buffer status information related to the first buffer and the second buffer comprised in the at least one master apparatus, a priority of a shared resource access request received from the at least one master apparatus.

2. The shared resource access arbitration method of claim 1, wherein the buffer status information comprises size information of stored data compared to a total storage space of the buffer.

3. The shared resource access arbitration method of claim 1, wherein the buffer comprises an input buffer, and wherein the determining, based on the received buffer status information, of the priorities of the shared resource access requests received from the plurality of master apparatuses comprising the at least one master apparatus comprises determining, when a size of stored data compared to a total storage space of the input buffer is small, a priority of a shared resource access request received from the at least one master apparatus comprising the input buffer to be higher than a priority of a shared resource access request received from another master apparatus.

4. The shared resource access arbitration method of claim 1, wherein the buffer comprises an output buffer, and wherein the determining, based on the received buffer status information, of the priorities of the shared resource access requests received from the plurality of master apparatuses comprising the at least one master apparatus comprises determining, when a size of stored data compared to a total storage space of the output buffer is large, a priority of a shared resource access request received from the at least one master apparatus comprising the output buffer to be higher than a priority of a shared resource access request received from another master apparatus.

5. A computer-readable recording medium having recorded thereon a program for implementing the method of claim 1.

6. A shared resource access arbitration apparatus comprising:

a buffer status information receiver configured to receive, from at least one master apparatus, buffer status information related to a buffer included in the at least one master apparatus; and at least one processor configured to:

determine, based on the buffer status information, priorities of shared resource access requests received from a plurality of master apparatuses comprising the at least one master apparatus, grant, according to the determined priorities of the shared resource access requests, one of the shared resource access requests having a high priority, determine a data bus, from among data buses connected to the plurality of master apparatuses, connected to a master apparatus, from among the plurality of master apparatuses, the master apparatus having transmitted the granted shared resource access request, so that the master apparatus having transmitted the granted shared resource access request is allowed to access a shared resource apparatus, and arbitrate, via the determined data bus, data which is transmitted and received between the master apparatus having transmitted the granted shared resource access request and the shared resource apparatus, wherein data buses connected to the plurality of master apparatuses and a data bus connected to the shared resource apparatus are connected to the shared resource access arbitration apparatus, wherein the data buses connected to the plurality of master apparatuses and the data bus connected to the shared resource apparatus are related to a data signal and are not related to control signals including a grant signal and a request signal, wherein the buffer is included in at least one processor in the at least one master apparatus, wherein the buffer comprises a first buffer comprising data which is transmitted to or received from an external apparatus and a second buffer comprising data related to internal processing of the at least one master apparatus and which is not directly connected to a bus interface, and wherein the controller is further configured to determine, based on buffer status information related to the first buffer and the second buffer related to the at least one master apparatus, a priority of a shared resource access request received from the at least one master apparatus.

7. The shared resource access arbitration apparatus of claim 6, wherein the buffer status information comprises size information of stored data compared to a total storage space of the buffer.

8. The shared resource access arbitration apparatus of claim 6, wherein the buffer comprises an input buffer, and wherein the at least one processor is further configured to determine, when a size of stored data compared to a total storage space of the input buffer is small, a priority of a shared resource access request received from the at least one master apparatus comprising the input buffer to be higher than a priority of a shared resource access request received from another master apparatus.

9. The shared resource access arbitration apparatus of claim 6, wherein the buffer comprises an output buffer, and
wherein the at least one processor is further configured to determine, when a size of stored data compared to a total storage space of the output buffer is large, a priority of a shared resource access request received from the at least one master apparatus comprising the output buffer to be higher than a priority of a shared resource access request received from another master apparatus.

* * * * *